United States Patent
Hoshino

(10) Patent No.: US 11,157,020 B2
(45) Date of Patent: Oct. 26, 2021

(54) OMNIDIRECTIONAL MOVING DEVICE AND ATTITUDE CONTROL METHOD FOR THE SAME

(71) Applicant: Public University Corporation Suwa University of Science Foundation, Nagano (JP)

(72) Inventor: Tasuku Hoshino, Tokyo (JP)

(73) Assignee: Public University Corporation Suwa University of Science Foundation, Nagano (JP)

( * ) Notice: Subject to any disclaimer, the term of this patent is extended or adjusted under 35 U.S.C. 154(b) by 106 days.

(21) Appl. No.: 16/617,029

(22) PCT Filed: May 14, 2018

(86) PCT No.: PCT/JP2018/018611
§ 371 (c)(1),
(2) Date: Nov. 26, 2019

(87) PCT Pub. No.: WO2018/216530
PCT Pub. Date: Nov. 29, 2018

(65) Prior Publication Data
US 2021/0132633 A1 May 6, 2021

(30) Foreign Application Priority Data
May 26, 2017 (JP) .............................. JP2017-104669

(51) Int. Cl.
*B60K 17/30* (2006.01)
*G05D 1/08* (2006.01)
(Continued)

(52) U.S. Cl.
CPC ......... *G05D 1/0891* (2013.01); *B60B 19/003* (2013.01); *B60B 19/12* (2013.01);
(Continued)

(58) Field of Classification Search
CPC .... G05D 1/0891; B60B 19/003; B60B 19/12; B60G 13/003; B60G 17/016;
(Continued)

(56) References Cited

U.S. PATENT DOCUMENTS 4,237,990 A * 12/1980 La .......................... B60B 19/125
180/7.1
9,032,859 B2 * 5/2015 Fox .......................... F41A 27/28
89/41.19

(Continued)

FOREIGN PATENT DOCUMENTS

| CN | 102149596 A | 8/2011 |
|---|---|---|
| CN | 106394715 A | 2/2017 |

(Continued)

OTHER PUBLICATIONS

Aug. 4, 2020 (CN) Office Action Application No. 2018800346699.
Aug. 8, 2020 (CN) Office Action Application No. 2018800346699.

*Primary Examiner* — Toan C To
(74) *Attorney, Agent, or Firm* — Banner & Witcoff, Ltd.

(57) ABSTRACT

An omnidirectional moving device is provided with a vehicle chassis, a vehicle body, a universal coupling, and an attitude stabilizing system. In the vehicle chassis, a plurality of wheels that are capable of moving omnidirectionally are provided. The vehicle body is mounted on the vehicle chassis. The universal coupling connects the vehicle chassis to the vehicle body, and the attitude of the vehicle body relative to the vehicle chassis can be changed via this universal coupling. The attitude stabilizing system causes the vehicle chassis to move in a direction that corresponds to a change in the attitude of the vehicle body, and maintains the attitude stability of the vehicle body.

10 Claims, 33 Drawing Sheets

(51) Int. Cl.
*B60B 19/00* (2006.01)
*B60B 19/12* (2006.01)
*B60G 13/00* (2006.01)
*B60G 17/016* (2006.01)
*B60G 17/019* (2006.01)
*B60G 21/00* (2006.01)
*B62D 27/02* (2006.01)
*B62D 51/02* (2006.01)
*B62D 61/00* (2006.01)

(52) U.S. Cl.
CPC ......... *B60G 13/003* (2013.01); *B60G 17/016* (2013.01); *B60G 17/01908* (2013.01); *B60G 21/00* (2013.01); *B62D 27/02* (2013.01); *B62D 51/02* (2013.01); *B62D 61/00* (2013.01); *B60G 2400/051* (2013.01); *B60G 2400/052* (2013.01); *B60G 2400/10* (2013.01); *B60G 2500/00* (2013.01)

(58) Field of Classification Search
CPC .............. B60G 17/01908; B60G 21/00; B60G 2400/051; B60G 2400/052; B60G 2400/10; B60G 2500/00; B62D 27/02; B62D 51/02; B62D 61/00
USPC .............................................. 180/7.1, 20, 21
See application file for complete search history.

(56) References Cited

U.S. PATENT DOCUMENTS

| | | | |
|---|---|---|---|
| 9,864,396 B1* | 1/2018 | Brown | B62D 6/08 |
| 9,999,557 B2* | 6/2018 | Diaz-Flores | A61G 5/023 |
| 2008/0110682 A1* | 5/2008 | Maruo | G05D 1/0263 |
| | | | 180/20 |
| 2009/0299525 A1* | 12/2009 | Takahashi | G05D 1/024 |
| | | | 700/258 |
| 2016/0140861 A1* | 5/2016 | Tischer | B60G 17/00 |
| | | | 434/69 |
| 2016/0302981 A1 | 10/2016 | Halsall | |
| 2018/0334029 A1* | 11/2018 | Xiong | B60K 17/24 |
| 2019/0167497 A1* | 6/2019 | Depalo | B60B 19/003 |
| 2020/0079448 A1* | 3/2020 | Chen | B60K 1/00 |

FOREIGN PATENT DOCUMENTS

| | | |
|---|---|---|
| EP | 3081472 A1 | 10/2016 |
| JP | 3070015 B2 | 7/2000 |
| JP | 2006282160 A | 10/2006 |
| JP | 2009234524 A | 10/2009 |
| JP | 2010076630 A | 4/2010 |
| JP | 2015047961 A | 3/2015 |
| JP | 2016198494 A | 12/2016 |
| JP | 2017052417 A | 3/2017 |

* cited by examiner

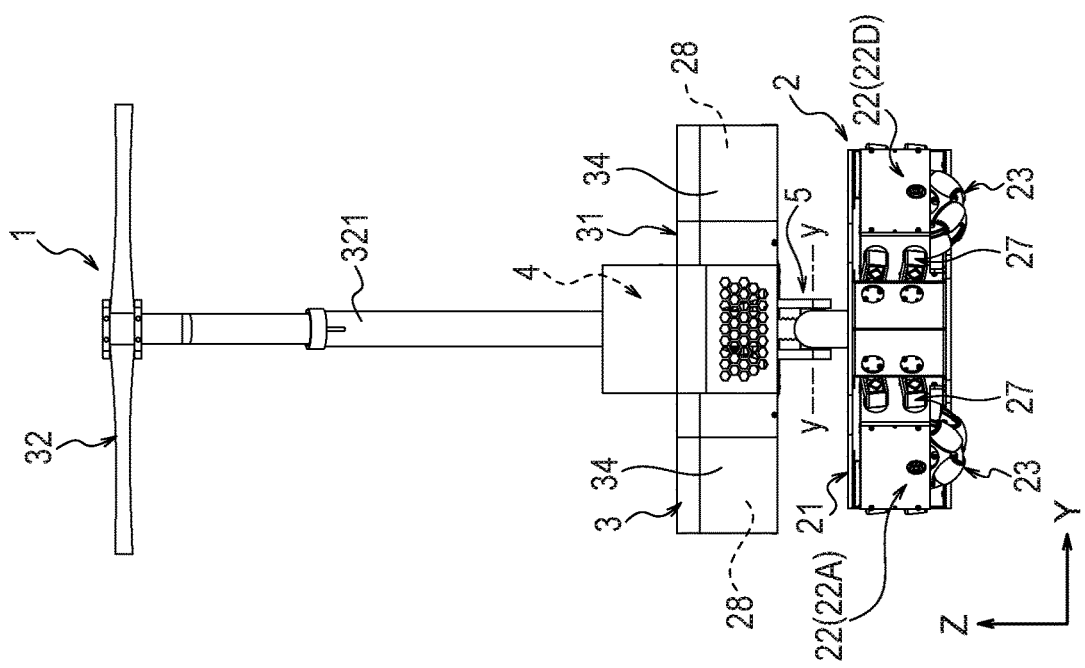

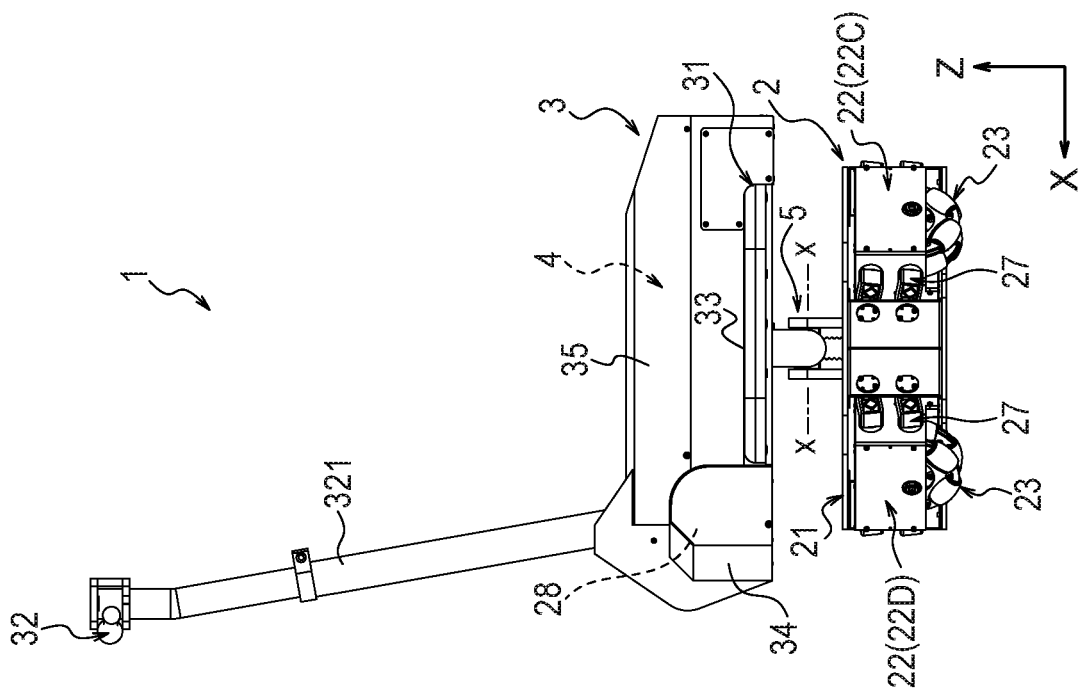

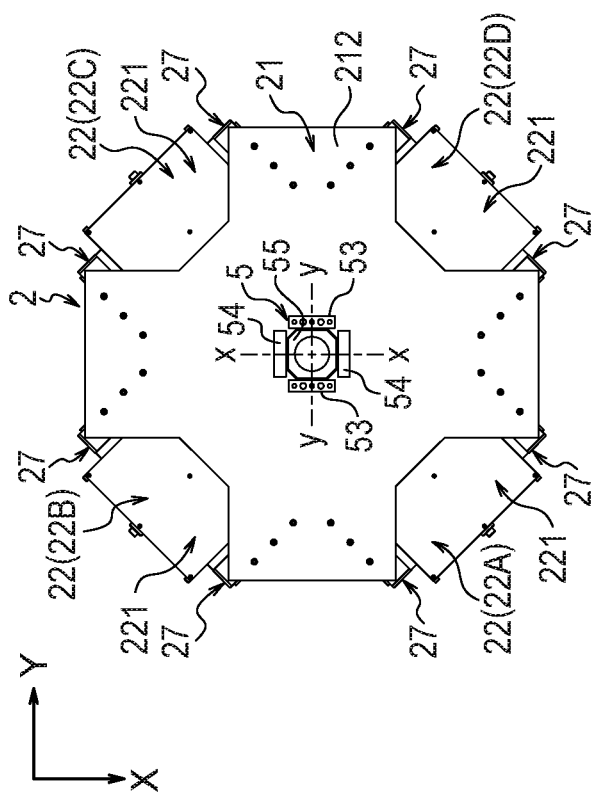

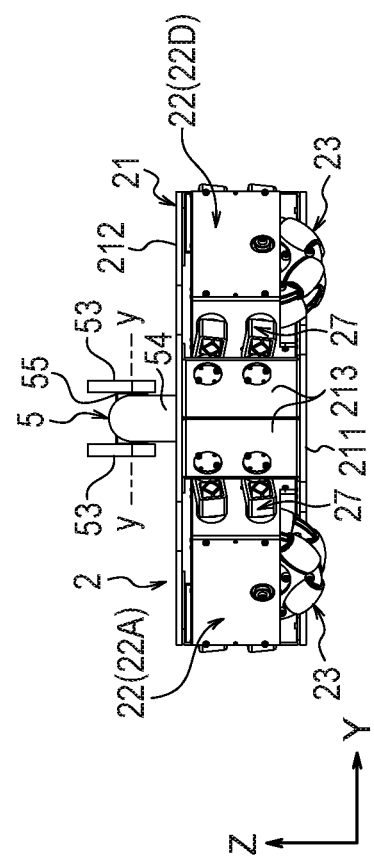

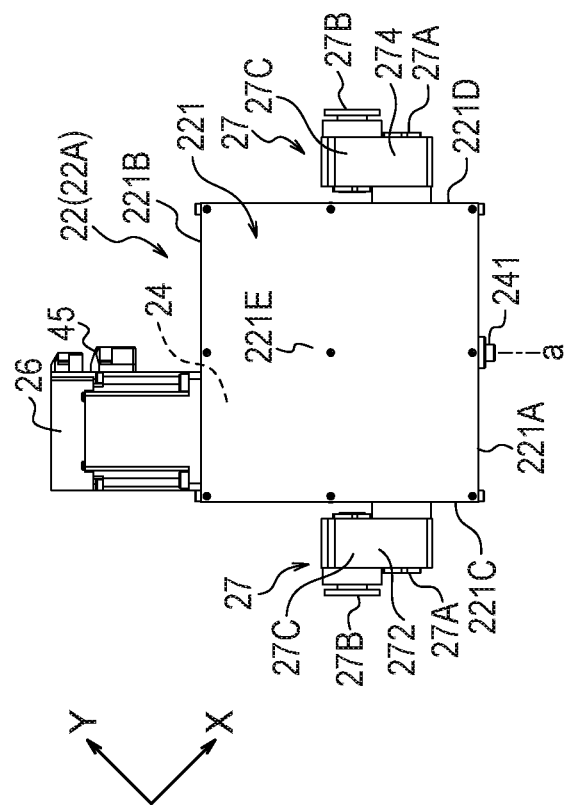

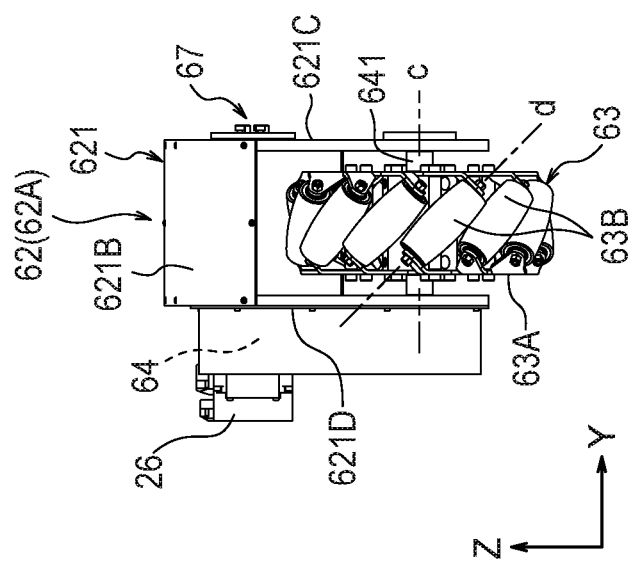

OMNIDIRECTIONAL MOVING DEVICE AND ATTITUDE CONTROL METHOD FOR THE SAME

CROSS-REFERENCE TO RELATED APPLICATIONS

This application is a National Stage Application under 35 U.S.C. 371 of co-pending PCT application number PCT/JP2018/018611 designating the United States and filed May 14, 2018, the disclosure of which is incorporated herein by reference in its entirety. Further, this application claims the benefit of Japanese Patent Application 2017-104669 and filed May 26, 2017, the disclosure of which is incorporated herein by reference in its entirety.

TECHNICAL FIELD

Disclosed technology in the invention relates to an omnidirectional moving device and to an attitude control method for the same.

BACKGROUND ART

An omnidirectional moving device (i.e., an omnidirectional moving vehicle) is disclosed in Japanese Patent No. 3070015. In this omnidirectional moving device, because a single spherical body (i.e., a rotating body) is fitted into a frame so as to be able to rotate freely, the frame is statically unstable. Additionally, because an omnidirectional moving device travels by rotating the sphere, and the attitude of the frame is kept stable during this travel, the frame is dynamically stabilized.

SUMMARY OF THE INVENTION

Technical Problem

In the above-described omnidirectional moving device, the contact between the sphere and the travel path (i.e., the ground surface) is point contact. In other words, the contact surface area between the sphere and the travel path is small, and the sphere is unable to obtain adequate grip while traveling.

In addition, in the above-described omnidirectional moving device, the sphere performs a rolling movement when traveling over a travel path. Consequently, dust and liquids from the travel path adhere to the surface of the sphere, and if the sphere slips on the travel path due to such dust and liquids, then the sphere is unable to obtain adequate grip when traveling. Because of this, there is room for improvement with regard to improving the propulsive force of the omnidirectional moving device.

Moreover, in the above-described omnidirectional moving device, because the sphere is in contact with the travel path at only one point, compared with when a plurality of vehicle wheels are in contact with a travel path, when traveling over bumps or rough ground vibration is transmitted directly to the frame. Because of this, there is also room for improvement with regard to quietness while traveling, including the ride comfort of the above-described omnidirectional moving device.

Disclosed technology in the invention was conceived in view of the above-described circumstances, and it is an object thereof to provide an omnidirectional moving device and an attitude control method for the same that enable a vehicle body that is statically unstable to be dynamically stabilized, and that improve propulsive force, and that also improve quietness.

Solution to the Problem

In order to solve the above-described problems, an omnidirectional moving device according to a first aspect in the invention is provided with a vehicle chassis provided with a plurality of wheels that are movable omnidirectionally, a vehicle body that is disposed on the vehicle chassis, a universal coupling that joins the vehicle chassis to the vehicle body, and that enables an attitude of the vehicle body to be changed relative to the vehicle chassis, and an attitude stabilizing system that moves the vehicle chassis in a direction in which the attitude of the vehicle body has been changed, and that maintains attitude stability of the vehicle body.

The omnidirectional moving device according to the first aspect is provided with a vehicle chassis and a vehicle body that is disposed on the vehicle chassis. Wheels are disposed on the vehicle chassis, and these wheels are movable omnidirectionally.

Here, this omnidirectional moving body is provided with a universal coupling and an attitude stabilizing system, and the plurality of wheels are mounted on the vehicle chassis. The universal coupling joins the vehicle chassis to the vehicle body, and enables the attitude of the vehicle body relative to the vehicle chassis to be changed.

If a plurality of wheels are provided, then all of these wheels are in ground contact with the travel path. Because of this, the attitude of the vehicle chassis changes to match the inclination of the road surface of the travel path. In contrast, because the vehicle body is joined to the vehicle chassis via the universal coupling, the attitude of the vehicle body is unrelated to the attitude of the vehicle chassis. In other words, because the vehicle body is joined to the vehicle chassis solely via the universal coupling, the vehicle body is statically unstable relative to the vehicle chassis.

The attitude stabilizing system moves the vehicle chassis in the direction in which the attitude of the vehicle body has changed, and maintains the attitude stability of the vehicle body. In other words, because the attitude stabilizing system is provided, the attitude of the vehicle body can be kept stable when the vehicle chassis moves, and the vehicle body can be dynamically stabilized.

In addition, because there are a plurality of ground contact locations between the plurality of provided wheels and the travel path, the contact surface area between the wheels and the travel path is increased, and the wheels can obtain an adequate grip when the wheels are moving. Because an adequate grip can be obtained, even if dust or liquid on the travel path does become adhered to the wheel surface, slipping of the wheels on the travel path is reduced.

Furthermore, because a plurality of wheels are in ground contact with the travel path, compared with when a single sphere is in ground contact with the travel path, vibrations from bumps or rough ground that are transmitted to the vehicle chassis and vehicle body when moving are reduced.

An omnidirectional moving device according to a second aspect in the invention is characterized in that, in the omnidirectional moving device according to the first aspect, the universal coupling has two kinematic pairs.

According to the omnidirectional moving device according to the second aspect, because the number of kinematic pairs of the universal coupling is two, the vehicle body has degrees of freedom in two directions relative to the vehicle chassis, and the attitude of the vehicle body can be changed in these two directions. For example, if the two degrees of freedom are set such that a Y axial direction of a three-dimensional coordinate system is taken as a first rotation axis and one degree of freedom pivots around this first rotation axis, and an X axial direction is taken as a second rotation axis and one degree of freedom pivots around this second rotation axis, then the attitude of the vehicle body can be changed within the range of these two degrees of freedom. Here, no degree of freedom that pivots around a third rotation axis that extends in a Z axial direction is set. Because of this, when the vehicle chassis is turned, the vehicle body can be turned so as to track the turning of the vehicle chassis.

An omnidirectional moving device according to a third aspect in the invention is characterized in that, in the omnidirectional moving device according to the second aspect, the universal coupling comprises first rotation shafts that are supported at an upper portion of the vehicle chassis, and that have one movement direction of the vehicle chassis as a first axial direction, second rotation shafts that are supported at a lower portion of the vehicle body, and that have a second axial direction, which is another movement direction of the vehicle chassis and which intersects the first axial direction and a spider that is rotatable around the first rotation shafts, and is also rotatable around the second rotation shafts.

According to the omnidirectional moving device according to the third aspect, the universal coupling is provided with first rotation shafts, second rotation shafts, and a spider. The first rotation shafts are supported in an upper portion of the vehicle chassis, and take one direction of movement of the vehicle chassis as a first axial direction thereof. For example, a Y axial direction illustrated in the second aspect is taken as a first axial direction thereof. The second rotation shafts are supported in a lower portion of the vehicle body, and another direction of movement of the vehicle chassis, which direction also intersects the first axial direction, is taken as a second axial direction thereof. For example, an X axial direction which is orthogonal to the Y axial direction illustrated in the second exemplary embodiment is taken as a second axial direction thereof. The spider is capable of rotating around the first rotation shafts, and is also capable of rotating around the second rotation shafts.

As a consequence, because the spider is capable of rotating around two rotation shafts, namely, the first rotation shafts and the second rotation shafts, a universal coupling having two kinematic pairs can be easily achieved.

An omnidirectional moving device according to a fourth aspect in the invention is characterized in that, in the omnidirectional moving device according to any one of the first through third aspects, the attitude stabilizing system is provided with a drive unit having a motor that is provided in the vehicle chassis, a reduction gear that is provided in the vehicle chassis, and that increases driving torque of the motor and transmits the driving torque to the wheels, and a servo amp that is provided in the vehicle body, and is connected to the motor so as to drive the motor.

According to the omnidirectional moving device according to the fourth aspect, the attitude stabilizing system is provided with drive units. The drive unit is formed so as to include a motor, a reduction gear, and a servo amp. The motor is provided in the vehicle chassis. The reduction gear is provided in the vehicle chassis, and increase driving torque from the motor, then transmits this driving torque to the wheels. The servo amp is provided in the vehicle body, and is connected to the motor so as to drive the motor.

Because the drive unit that is formed so as to include these portions is provided, in the attitude stabilizing system, the attitude of the vehicle body can be kept stable when the vehicle chassis moves, and the vehicle body can be dynamically stabilized.

An omnidirectional moving device according to a fifth aspect in the invention is characterized in that, in the omnidirectional moving device according to the first aspect through the fourth aspect, the wheels are at least one of Omni wheels or Mecanum wheels.

According to the omnidirectional moving device according to the fifth aspect, the wheels are at least one of Omni wheels and Mecanum wheels. Omni wheels are formed by providing a plurality of rollers on a circumference of a driving wheel. The rollers rotate freely taking a circumferential direction of the driving wheel as their axial direction. In contrast, Mecanum wheels are formed by providing a plurality of rollers on a circumference of a driving wheel. These rollers rotate freely taking a direction that is inclined relative to the rotation axis of the drive wheel as their axial direction.

As a consequence, because it is possible, using either of these types of wheel, to cause the vehicle chassis to move in a movement direction made possible by the rotation of the rollers, in addition to a movement direction made possible by the rotation of the driving wheels, it is possible to obtain an omnidirectional moving device that is capable of moving in all directions on a plane.

An omnidirectional moving device according to a sixth aspect in the invention is characterized in that, in the omnidirectional moving device according to the fourth aspect, the attitude stabilizing system is provided with a control unit having an angle detection portion that acquires a rotation angle of the motor, an attitude angle detection portion that acquires an attitude angle of the vehicle body and an angular velocity of the vehicle body, and a computation unit that, based on the rotation angle acquired by the angle detection portion, and the attitude angle and the angular velocity acquired by the attitude angle detection portion, calculates an operating state for the vehicle body that maintains the attitude stability of the vehicle body, and controls the servo amp based on a result of the calculation.

According to the omnidirectional moving device according to the sixth aspect, the attitude stabilizing system is provided with a control unit having an angle detection portion, an attitude angle detection portion, and a computation unit. The angle detection portion of the control unit acquires a rotation angle of the motor. The attitude angle detection portion acquires an attitude angle of the vehicle body and an angular velocity of the vehicle body. The computation unit calculates an operating state for the vehicle body that maintains the attitude stability of the vehicle body based on the acquired rotation angle, attitude angle, and angular velocity. Furthermore, in the computation unit, the servo amp is controlled based on the result of the calculation. Because of this, in the attitude stabilizing system, the attitude of the vehicle body can be kept stable when the vehicle chassis is moved, and the vehicle body can be dynamically stabilized.

An omnidirectional moving device according to a seventh aspect in the invention is characterized in that, in the omnidirectional moving device according to any one of the first through sixth aspects, further comprising a damping device that is disposed between the wheels and the vehicle chassis, and that reduces vibration transmitted from the wheels to the vehicle chassis.

According to the omnidirectional moving device according to the seventh aspect, a damping device is provided between the wheels and the vehicle chassis. Because of this, vibration that is generated in the wheels due to the state of the road surface while moving on a travel path is reduced by the damping device, and the vibration transmitted from the wheels to the vehicle chassis and the vehicle body can be reduced.

An omnidirectional moving device according to an eighth aspect in the invention is characterized in that, in the omnidirectional moving device according to the third aspect, a locking device that enables the attitude of the vehicle body to be changed when the vehicle chassis is moving, and locks the attitude of the vehicle body when the vehicle chassis has stopped is fitted onto the first rotation shafts and the second rotation shafts.

According to the omnidirectional moving device according to the eighth aspect, a locking device is fitted onto the first rotation shafts and the second rotation shafts. This locking device enables the attitude of the vehicle body to be changed when the vehicle chassis is moving, and locks the attitude of the vehicle body when the vehicle chassis has stopped. Additionally, the locking device also enables the attitude of the vehicle body to be locked when the vehicle chassis is not moving.

As a consequence, because the attitude of the vehicle body can be kept stable even when movement of the vehicle chassis is stopped, it is possible to improve the safety of a passenger when they are getting on or off the omnidirectional moving device, or during an emergency.

An attitude control method for an omnidirectional moving device according to a ninth aspect in the invention is provided with the attitude stabilizing system of the omnidirectional moving device according to the sixth aspect, and the attitude control method comprising the attitude stabilizing system to execute a process including acquiring a rotation angle of the motor, acquiring an attitude angle of the vehicle body and an angular velocity of the vehicle body, calculating, based on the rotation angle, the attitude angle, and the angular velocity, an operating state of the vehicle body that maintains the attitude stability of the vehicle body, and controlling the servo amp based on a calculation result so as to move the vehicle chassis in a state in which the attitude stability is maintained.

In the attitude control method for an omnidirectional moving device according to the ninth aspect, firstly, a rotation angle of the motor is acquired, and an attitude angle of the vehicle body and an angular velocity of the vehicle body are acquired. Next, based on the acquired rotation angle, attitude angle, and angular velocity, an operating state for the vehicle body is calculated so as to maintain the attitude stability. Based on the result of this calculation, the vehicle chassis is moved in a state that maintains the attitude stability of the vehicle body. Because of this, using this attitude control method, it is possible to move the vehicle chassis while dynamically stabilizing the vehicle body of an omnidirectional moving device.

Advantageous Effects in the Invention

According to in the invention, it is possible to provide an omnidirectional moving device and an attitude control method for the same that enable a vehicle body that is statically unstable to be dynamically stabilized, and that improve propulsive force, and that also improve quietness.

BRIEF DESCRIPTION OF THE DRAWINGS

FIG. 2B is a front view as seen from the front showing the same omnidirectional moving device, and FIG. 2C is a side view as seen from a side showing the same omnidirectional moving device.

FIG. 3B is a top view as seen from above showing the vehicle chassis, FIG. 3C is a front view as seen from the front showing the vehicle chassis.

FIG. 4B is a top view as seen from above showing the drive unit.

FIG. 13C is a front view as seen from the front showing the wheel and drive unit.

DESCRIPTION OF THE EMBODIMENTS

First Exemplary Embodiment

Figure 1:
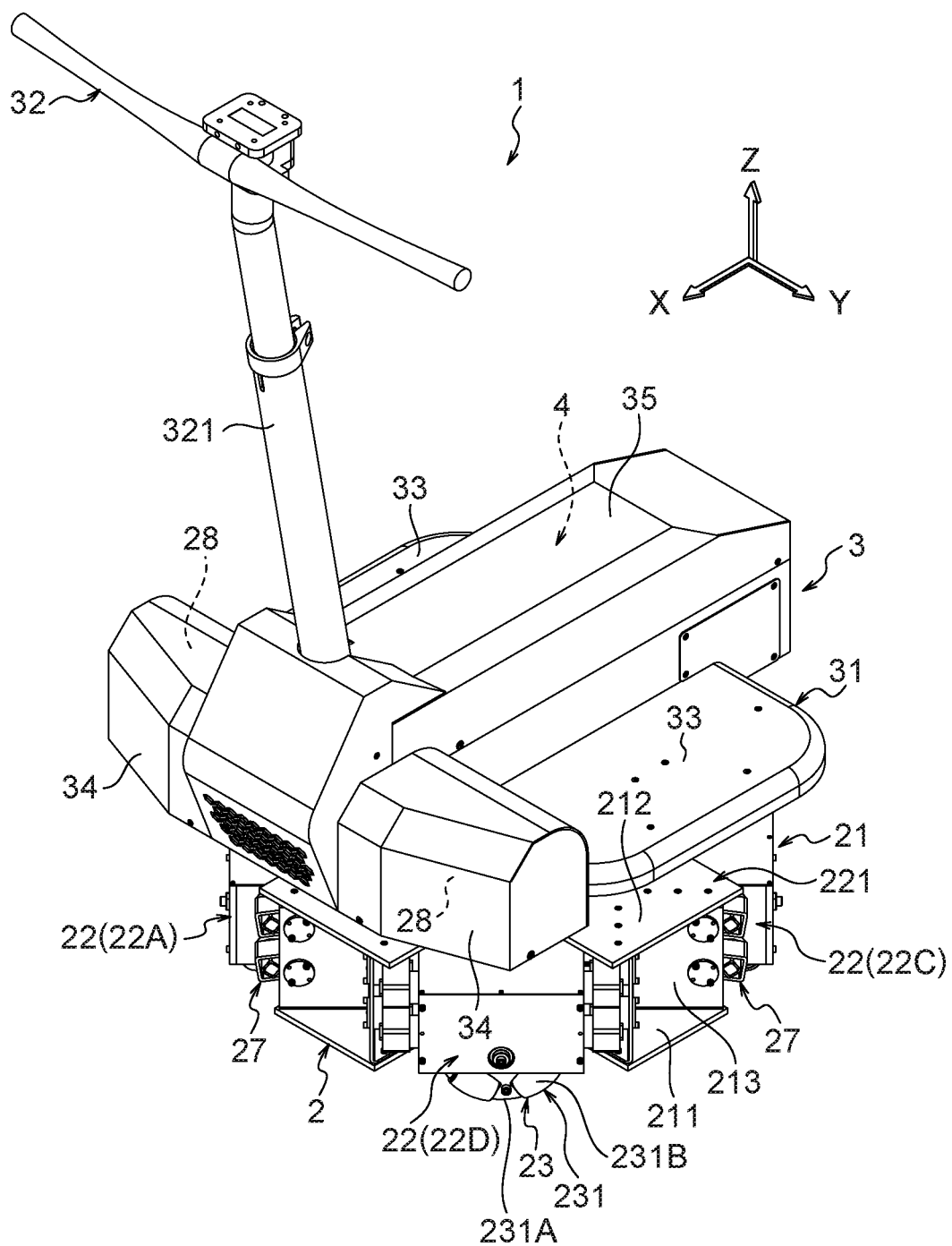
FIG. 1 is an external perspective view as seen from an upward direction on a left-front side showing an omnidirectional moving device according to a first exemplary embodiment in the invention.
Figure 2A:
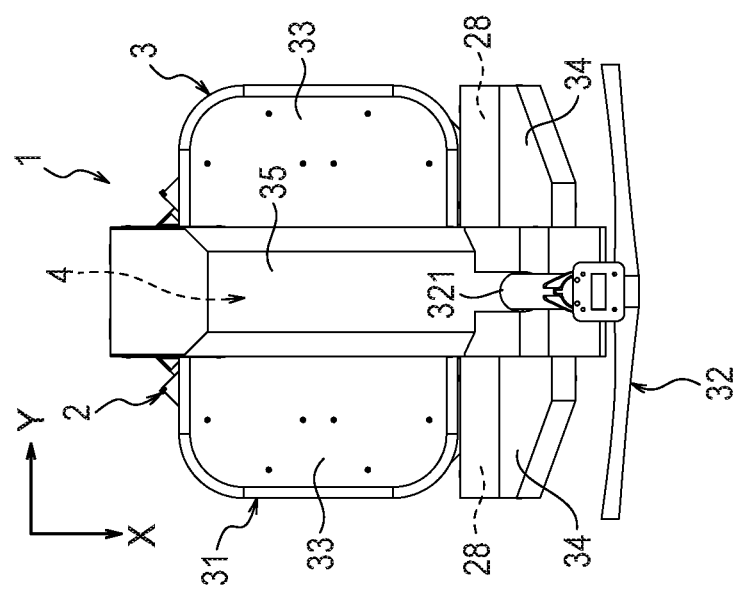
FIG. 2A is a top view as seen from above showing the omnidirectional moving device shown in FIG. 1.

Hereinafter, an omnidirectional moving device and an attitude control method for the same according to a first exemplary embodiment in the invention will be described using FIG. 1 through FIG. 9.

Note that, in the drawings, a direction appropriately shown where by an arrow X indicates a vehicle front direction of an omnidirectional moving device (i.e., a vehicle), while a direction of an arrow Y indicates a vehicle width direction of the omnidirectional moving device which is orthogonal to the direction indicated by the arrow X. In other words, the direction of the arrow X and the direction of the arrow Y coincide with an X axial direction and a Y axial direction of a horizontal plane of a three-dimensional coordinate system. In addition, a direction of an arrow Z indicates a vehicle upward direction which is orthogonal to both the direction of the arrow X and the direction of the arrow Y. The direction of the arrow Z coincides with a Z axial direction which is a vertical direction of a three-dimensional coordinate system.

Here, applicable directions of an omnidirectional moving device are not restricted to those of the present exemplary embodiments.

[Structure of an Omnidirectional Moving Device]

As is shown in FIG. 1 and FIG. 2A through FIG. 2C, an omnidirectional moving device 1 according to the present exemplary embodiment is provided with a vehicle chassis 2 that is capable of moving omnidirectionally, a vehicle body 3 that is mounted onto the vehicle chassis 2, and an attitude stabilizing system 4 that moves the vehicle chassis 2 and also maintains a stability of an attitude of the vehicle body 3. Furthermore, the omnidirectional moving device 1 is formed so as to include a universal coupling 5 that connects the vehicle chassis 2 to the vehicle body 3. Here, the term 'omnidirectional' is used to mean all directions including front, rear, left, and right on a horizontal plane, as well as diagonal directions relative to these, and including turning directions.

(1) Structure of the Vehicle Chassis 2

As is shown in FIG. 1 and FIG. 2A through FIG. 2C, and particularly in FIG. 3A through FIG. 3D, the vehicle chassis 2 is provided with a vehicle main chassis 21. This vehicle main chassis 21 is formed so as to include a bottom plate portion 211, a top plate portion 212, and side plate portions 213.

The bottom plate portion 211 is formed using a plate material whose plate thickness direction extends in a vehicle up-down direction, and is formed in a cruciform shape that protrudes in the vehicle front and rear directions and in the vehicle left and right width directions.

The top plate portion 212 is disposed above the bottom plate portion 211, and at a distance from the bottom plate portion 211. In the same way as the bottom plate portion 211, the top plate portion 212 is formed using a plate material whose plate thickness direction extends in the vehicle up-down direction, and is formed by a cruciform-shaped plate material when seen in a top view.

The side plate portions 213 are provided between the bottom plate portion 211 and the top plate portion 212. The side plate portions 213 are formed using plate materials whose plate thickness direction is a planar direction thereof by connecting two plate materials such that their plate thickness directions are mutually orthogonal, and such that they form a V shape that is open on a circumferential side when looked at in a top view. These side plate portions 213 that are formed in a V shape by connecting two plate materials together are disposed, in this case, in four locations in the portions of the bottom plate portion 211 and the top plate portion 212 that protrude in the cruciform shape when looked at in a top view. Note that the V-shaped side plate portions 213 may instead be formed by bending a single plate material.

The bottom plate portion 211, the top plate portion 212, and the side plate portions 213 here are formed from a metal material or a resin material having sufficient mechanical strength. For example, as the metal material, at least one selected from iron, an iron alloy containing stainless steel, and an aluminum alloy is used. As the resin material, at least one selected from carbon fiber reinforced plastic (CFRP) and glass fiber reinforced plastic (GFRP) is used.

Drive units 22 that form the attitude stabilizing system 4 are disposed in the vehicle main chassis 21 between mutually adjacent V-shaped side plates 213. More specifically, a drive unit 22A is disposed between a portion of the cruciform shape of each of the bottom plate portion 211 and the top plate portion 212 that protrudes towards the vehicle front side, and a portion thereof that protrudes towards the right side in the vehicle width direction as seen by a passenger who is riding on the omnidirectional moving device 1. In the same way, a drive unit 22B is disposed between a portion of the cruciform shape of each of the bottom plate portion 211 and the top plate portion 212 that protrudes towards the vehicle rear side, and the portion thereof that protrudes towards the right side in the vehicle width direction. Additionally, a drive unit 22C is disposed between a portion of the cruciform shape of each of the bottom plate portion 211 and the top plate portion 212 that protrudes towards the vehicle rear side, and a portion thereof that protrudes towards the left side in the vehicle width direction. Moreover, a drive unit 22D is disposed between a portion of the cruciform shape of each of the bottom plate portion 211 and the top plate portion 212 that protrudes towards the vehicle front side, and the portion thereof that protrudes towards the left side in the vehicle width direction.

In other words, a total of four drive units 22, namely, the drive unit 22A through the drive unit 22D are provided. A structure in which two or more of the drive units 22 are provided is generally taken as a basic structure, however, in the present exemplary embodiment, three or more drive units 22 are provided so that static stability of the vehicle chassis 2 on a travel path is ensured.

As is shown particularly in FIG. 4A through FIG. 4D, the drive unit 22A of the drive units 22 is provided with a drive unit casing 221, and is formed so as to include a motor 26, a reduction gear 24, and a servo amp 28 which is shown in FIG. 1 and FIG. 2.

The drive unit casing 221 is formed in a box shape having a front wall 221A, a rear wall 221B, a side wall 221C and a side wall 221D that are disposed as a pair on the left and right sides, and a top wall 221E, and a portion of a bottom surface thereof (a portion where a wheel 23 (described below) is disposed) is left open. The front wall 221A is disposed on an outer side of the vehicle chassis, while the rear wall 221B is disposed on the vehicle chassis inner side of the front wall 221A. The side wall 221C and the side wall 221D are disposed apart from each other between the front wall 221A and the rear wall 221B. The top wall 221E is disposed on an upper portion of each of the front wall 221A, the rear wall 221B, the side wall 221C, and the side wall 221D.

The motor 26 is an electric motor, and is fitted onto the rear wall 221B of the drive unit casing 221. A drive rotation shaft (not shown in the drawings) of the motor 26 is connected to one end (not shown in the drawings) of an output shaft 241 of the reduction gear 24 (not shown in the drawings) which is disposed inside the drive unit casing 221. Another end of the output shaft 241 is supported on the front wall 221A of the drive unit casing 221 so as to be able to rotate freely around a rotation axis a (see FIG. 4A, FIG. 4B, and FIG. 4D).

Figure 4A:
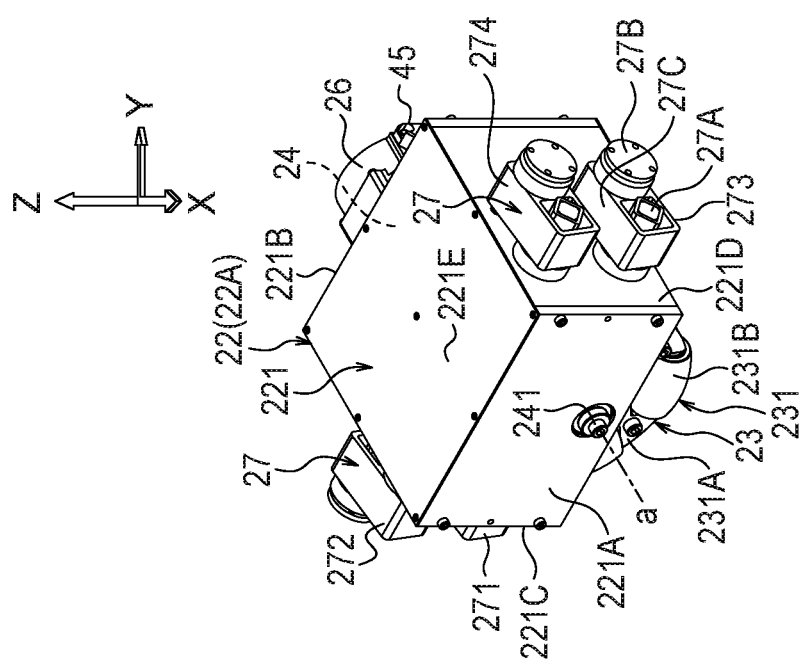
FIG. 4A is an external perspective view as seen from a diagonally upper-front direction showing one of the wheels of the vehicle chassis shown in FIG. 3, and a drive unit having this wheel.

Wheels 23 that enable the vehicle chassis 2 to be moved omnidirectionally are provided on the output shaft 241. As is shown in FIG. 4D, the wheels 23 are provided with a first Omni wheel 231 that is attached to a vehicle chassis outer side of the output shaft 241, and an Omni wheel 232 that is attached to the vehicle chassis inner side of the output shaft 241. In other words, the first Omni wheel 231 and the second Omni wheel 232 are attached via a double-link structure in the direction of the rotation axis a of the output shaft 241 to the output shaft 241.

Figure 4C:
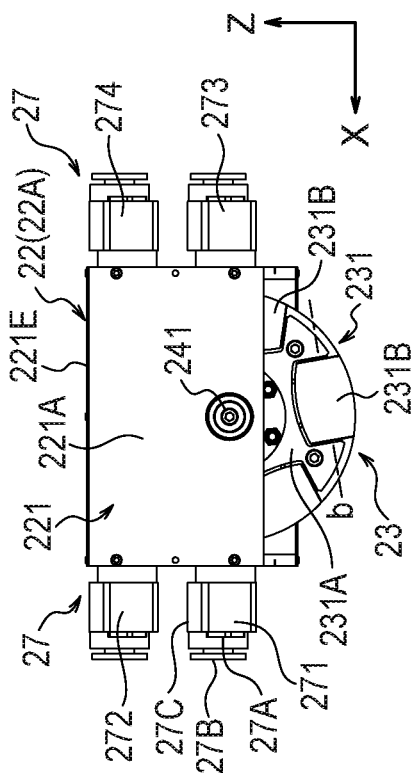
FIG. 4C is a front view as seen from the front showing the wheel and drive unit.
Figure 4D:
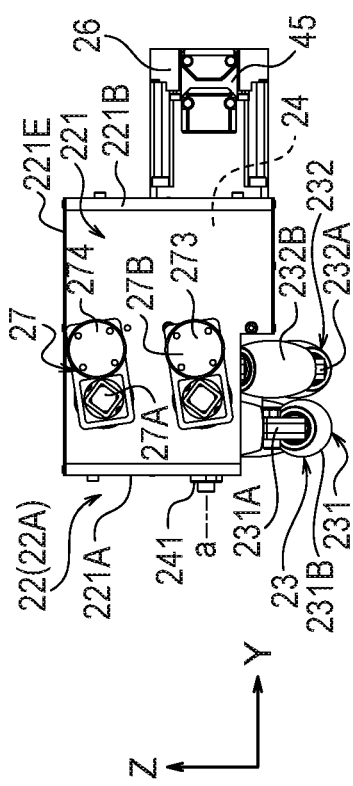
FIG. 4D is a side view as seen from a side showing the wheel and drive unit.

As is shown in FIG. 4C, the first Omni wheel 231 is formed by providing a plurality of barrel-shaped rollers 231B on a circumference of a circular-plate shaped driving wheel 231A, which is fixed to the output shaft 241, such that these rollers 231B rotate freely with a direction of a rotation axis b thereof extending in a circumferential direction of the driving wheel 231A. The rotation axis b is orthogonal at the skew position to the rotation axis a. In this case, five rollers 231B are arranged at equidistant placement pitches on the circumference of the driving wheel 231A.

Moreover, as is shown in FIG. 4D, in the same way as the first Omni wheel 231, the second Omni wheel 232 is formed by providing a plurality of barrel-shaped rollers 232B on a circumference of a circular-plate shaped driving wheel 232A, which is fixed to the output shaft 241, such that these rollers 232B rotate freely with a rotation axial direction thereof extending in the circumferential direction of the driving wheel 232A. The same number of rollers 232B as the rollers 231B are arranged at equidistant placement pitches on the circumference of the driving wheel 232A, and are positioned so as to be a half a pitch offset from the placement pitch of the rollers 231B.

Figure 3A:
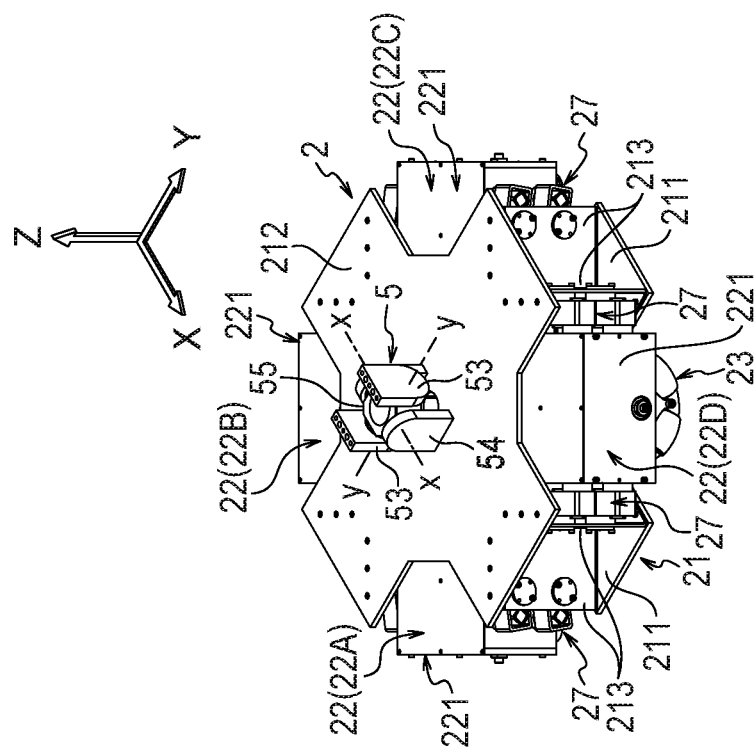
FIG. 3A is an external perspective view as seen from an upward direction on a left-front side showing a vehicle chassis of the omnidirectional moving device shown in FIG. 1.
Figure 3D:
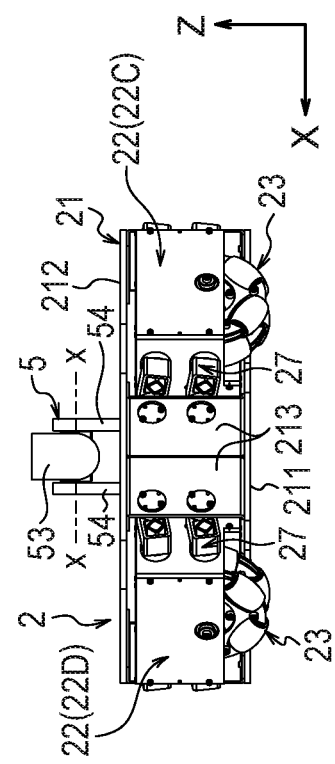
FIG. 3D is a side view as seen from a side showing the vehicle chassis.

As is shown in FIG. 3A, FIG. 3C, and FIG. 3D, and in FIG. 4A through FIG. 4D, the drive unit 22A is provided in the vehicle main chassis 21 via a damping device 27. The damping device 27 dampens vibrations transmitted from the travel path to the wheels 23 via the vehicle chassis 2 so that these vibrations are reduced. More specifically, as is shown in FIG. 4A through FIG. 4D, the damping device 27 is formed so as to include a total of four (however, the present invention is not limited to this number) damping cells, namely, a first damping cell 271 and a second damping cell 272 that are provided in the side wall 221C of the drive unit casing 221, and a third damping cell 273 and a fourth damping cell 274 that are provided in the side wall 221D thereof.

The first damping cell 271 is disposed in a lower portion of the side wall 221C, and is provided with a first supporting portion 27A, a second supporting portion 27B, a linking portion 27C, and a damping material (not shown in the drawings).

The first supporting portion 27A is supported on the side wall 221C, and projects outwards from this side wall 221C. The second supporting portion 27B is supported on a lower portion of the side plate portion 213 of the vehicle main chassis 21 shown in FIG. 3A through FIG. 3D, and projects outwards from the side plate portion 213 so as to be parallel with the first supporting portion 27A. The linking portion 27C is formed in a ring shape so as to encircle the first supporting portion 27A and the second supporting portion 27B, and connects the first supporting portion 27A and the second supporting portion 27B together. In addition, the linking portion 27C is formed so as to pivot around both the first supporting portion 27A and the second supporting portion 27B. For example, rubber springs or the like are used as the damping material.

This damping material is inserted between the first supporting portion 27A and the linking portion 27C, and between the second supporting portion 27B and the linking portion 27C, and supports the linking portion 27C such that the linking portion 27C is able to pivot freely relatively to each of the first supporting portion 27A and the second supporting portion 27B. In addition, via this damping material, it is possible to dampen vibration transmitted from the first supporting portion 27A to the linking portion 27C, and to dampen vibration transmitted from the linking portion 27C to the second supporting portion 27B.

The second damping cell 272 is disposed in an upper portion of the side wall 221C above the first damping cell 271 and in parallel with the first damping cell 271. The second damping cell 272 has the same structure as the first damping cell 271, and is provided with a first supporting portion 27A, a second supporting portion 27B, a linking portion 27C, and a damping material.

The third damping cell 273 and the fourth damping cell 274 are disposed between the side wall 221D of the drive unit casing 221 and the side plate portion 213 of the vehicle main chassis 21, and have the same structure as both the first damping cell 271 and the second damping cell 272.

The drive units 22B through 22D of the drive units 22 shown in FIG. 3A through FIG. 3D have the same structure as the drive unit 22A. As is shown in FIG. 3A and FIG. 3B, a direction in which the drive unit 22A and the drive unit 22C are arranged is offset at an angle of 45 degrees in a clockwise direction when looked at in a top view relative to the direction (i.e., the direction indicated by the arrow X) in which in which the bottom plate portion 211 and the top plate portion 212 of the vehicle main chassis 21 protrude the vehicle front and rear directions. A direction in which the drive unit 22D and the drive unit 22B are arranged is offset at an angle of 45 degrees in an anticlockwise direction relative to this same direction.

Note that the directions in which the drive unit 22A through the drive unit 22D are arranged are not limited to those described in the present exemplary embodiment. For example, it is also possible for the direction in which the drive unit 22A and the drive unit 22C are arranged to be offset at an angle of 30 degrees or an angle of 60 degrees in a clockwise direction relative to the aforementioned direction, and for the direction in which the drive unit 22D and the drive unit 22B are arranged to be offset at an angle of 30 degrees or an angle of 60 degrees in an anticlockwise direction relative to the aforementioned direction.

(2) Structure of the Vehicle Body 3

Returning to FIG. 1 and FIG. 2A through FIG. 2C, the vehicle body 3 is formed so as to include a vehicle main body 31, a handlebar 32, and foot placement portions 33. The vehicle main body 31 is disposed on the vehicle chassis 2. When looked at in a top view, the vehicle main body 31 is formed in a rectangular shape so as to approximately cover the vehicle chassis 2. External diametrical dimensions in the vehicle up-down direction of the vehicle main body 31 are set either as equivalent to, or as larger than the external diametrical dimensions in the same direction of the vehicle chassis 2.

A handle support 321 that stands upright is provided in a center of a vehicle front end portion of the vehicle main body 31, and the handlebar 32 is fitted to an upper end portion of the handle support 321. The handlebar 32 is formed in a rod shape that protrudes towards both the left and right outer sides in the vehicle width direction, and a passenger causes the omnidirectional moving device 1 to travel while standing upright and gripping the handlebar 32. In this case, the handlebar 32 is a fixed type of handle which is unable to turn around a vertical axis (i.e., around a Z axis).

Although not shown in the drawings, a starting switch that starts and stops the traveling of the omnidirectional moving device 1, and a brake and the like that regulates the speed during travel of the omnidirectional moving device 1 are mounted around the handlebar 32. In addition, lights and front indicators and the like are also able to be fitted as safety features to the handlebar 32 or to the handle support 321. Furthermore, rear indicators and brake lamps and the like can also be fitted as safety features to appropriate locations on a vehicle rear end portion of the vehicle main body 31.

Note that, in the same way as the bottom plate portion 211 and the like of the vehicle main chassis 21, the vehicle main body 31 is formed from a metal material or a resin material.

The foot placement portions 33 are provided as a pair on the left and right outer sides in the vehicle width direction in a central portion in the vehicle front-rear direction of the vehicle main body 31. The foot placement portions 33 are provided with flat portions that extend in the vehicle front-rear direction and in the vehicle width direction, and are used as portions where a passenger is able to place his/her foot and right foot.

A pair of left and right vehicle body covers 34 are attached to outer sides in the vehicle width direction from the handle support 321 in the front end portion of the vehicle main body 31. The servo amps 28 that form part of the aforementioned drive units 22 are housed inside the vehicle body covers 34.

In addition, a vehicle body cover 35 is attached to a portion extending from a central portion in the vehicle front-rear direction of the vehicle main body 31 to the rear end portion thereof so as to be sandwiched by the pair of foot placement portions 33. A portion of a control unit 40 (see FIG. 6) of the attitude control system 4 is housed inside this vehicle body cover 35.

Note that the vehicle body covers 34 and the vehicle body cover 35, including the foot placement portions 33, are formed from the same resin material as the resin material used for the bottom plate portion 211 and the like of the vehicle main chassis 21. By using a resin material, a complex shape can be easily molded.

(3) Structure of the Universal Coupling 5

Figure 5A:
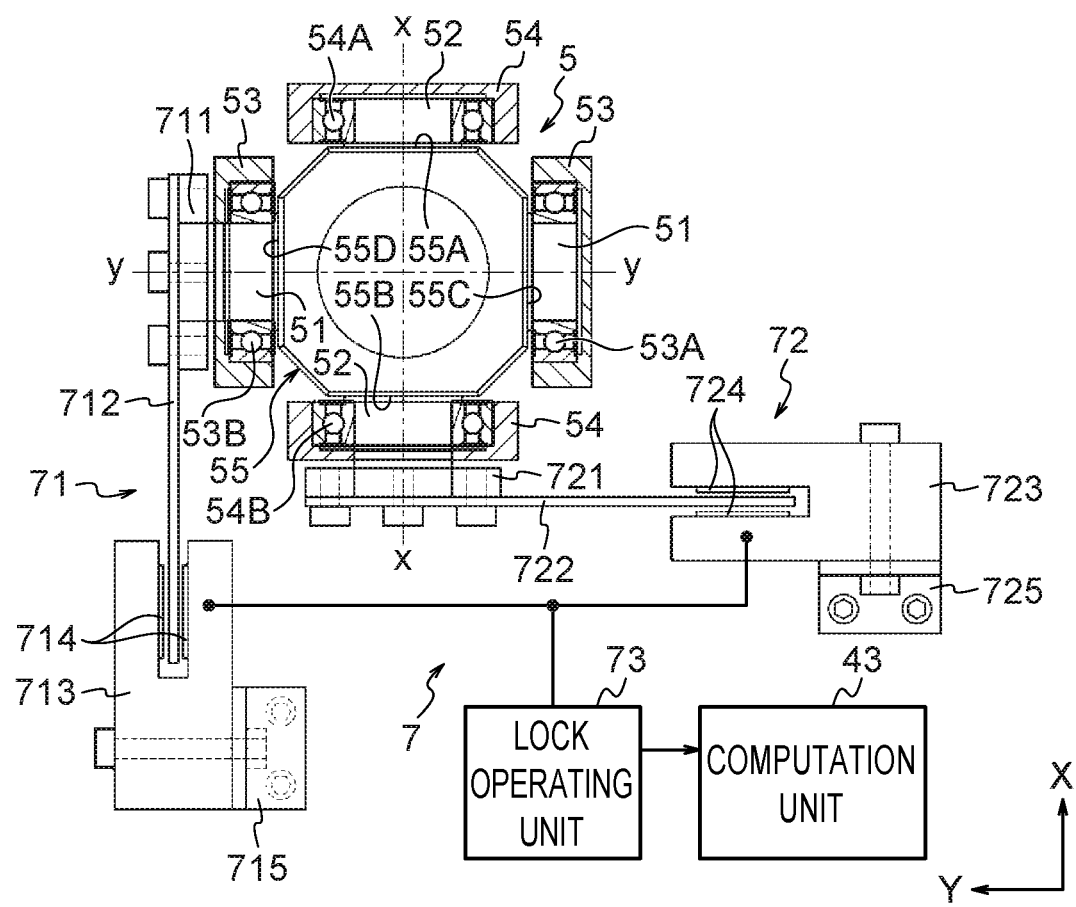
FIG. 5A is an enlarged top view as seen from above showing principal portions of a universal coupling and locking device of the omnidirectional moving device shown in FIG. 1 including a partial cross-section thereof.
Figure 5B:
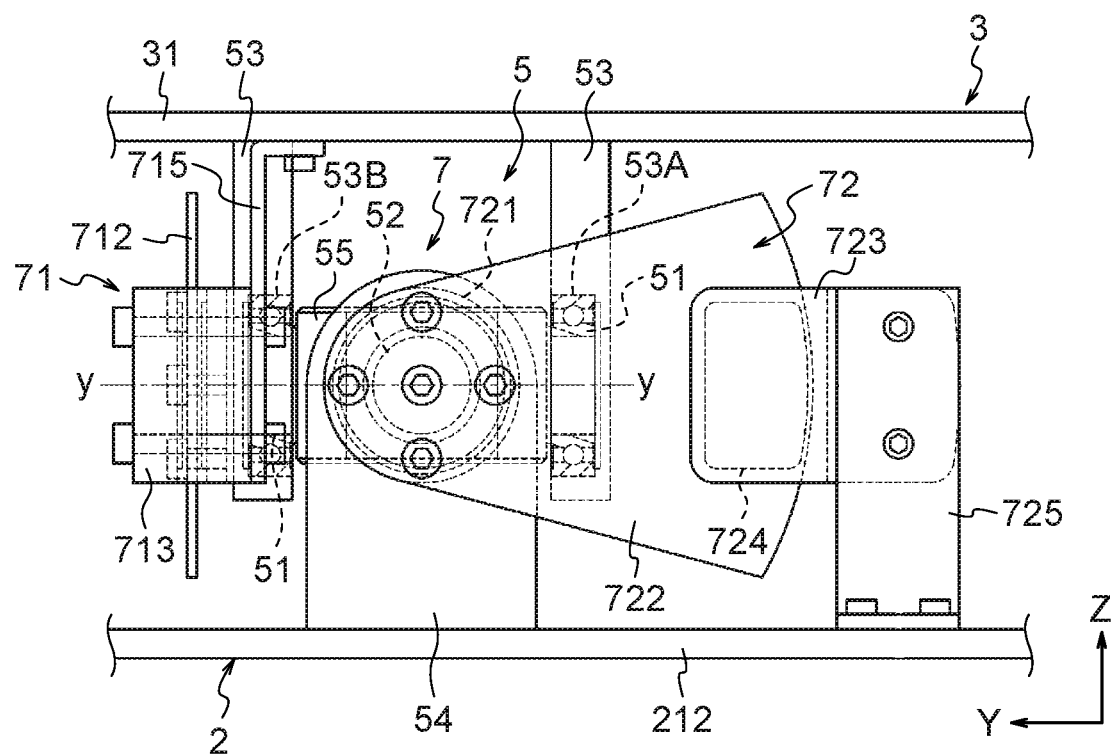
FIG. 5B is an enlarged side view as seen from a side showing principal portions of the universal coupling and locking device.

As is shown in FIG. 2B, FIG. 2C, FIG. 3A through FIG. 3D, FIG. 5A and FIG. 5B, and particularly in FIG. 5A and FIG. 5B, the universal coupling 5 is formed so as to include first rotation shafts 51, second rotation shafts 52, and a spider 55.

The spider 55 is formed in a hollow, square cylinder shape whose axial direction extends in the vehicle up-down direction, and has an outer peripheral surface 55A and an outer peripheral surface 55B that face each other in the vehicle front-rear direction, and an outer peripheral surface 55C and an outer peripheral surface 55D that face each other from the left and right in the vehicle width direction, and when looked at in a top view, is formed having a rectangular end surfaces configuration. In actuality, because chamfering is performed between the outer peripheral surfaces thereof, such as between the mutually adjacent outer peripheral surface 55A and outer peripheral surface 55C, the end surface configuration of the spider 55 is formed as an octagonal configuration.

The first rotation shafts 51 are formed such that one of the movement directions of the vehicle chassis 2, in this case, the vehicle width direction forms a first axial direction y thereof, and a pair of the first rotation shafts 51 are provided at a distance from each other in the first axial direction y in a lower portion in the center in the vehicle front-rear direction of the vehicle main body 31. One first rotation shaft 51 of this pair is formed on the outer peripheral surface 55C of the spider 55 so as to protrude towards the right side in the vehicle width direction from the outer peripheral surface 55C. The other first rotation shaft 51 is formed on the outer peripheral surface 55D so as to protrude towards the left side in the vehicle width direction from the outer peripheral surface 55D. The length in the first axial direction y of the other first rotation shaft 51 is set longer than that of the one first rotation shaft 51. The first rotation shafts 51 are fixed to the spider 55, and are either formed integrally therewith, or are bonded to the spider 55.

This pair of first rotation shafts 51 are supported in a central portion in the vehicle front-rear direction of the vehicle main body 31 via a pair of first supporting portions 53 that are provided apart from each other in the first axial direction y.

More specifically, the one first rotation shaft 51 is disposed on the right side in the vehicle width direction of the spider 55, and is fitted inside a bearing 53A that is fixed to one first supporting portion 53 of this pair that is disposed facing the outer peripheral surface 55C. The other first rotation shaft 51 is disposed on the left side in the vehicle width direction of the spider 55, and is fitted inside a bearing 53B that is fixed to the other first supporting portion 53 that is disposed facing the outer peripheral surface 55D.

The second rotation shafts 52 are formed such that another one of the movement directions of the vehicle chassis 2, which intersects the first axial direction y and which, in this case, is the vehicle front-rear direction which is orthogonal to the first axial direction y, forms a second axial direction x thereof, and a pair of the second rotation shafts 52 are provided at a distance from each other in the second axial direction x in an upper portion in the center of the top plate portion 212 of the vehicle chassis 2. In the present exemplary embodiment, the second axial direction x is set on the same horizontal plane as the first axial direction y. One second rotation shaft 52 of this pair is formed on the outer peripheral surface 55A of the spider 55 so as to protrude towards the vehicle front side from the outer peripheral surface 55A. The other second rotation shaft 52 is formed on the outer peripheral surface 55B so as to protrude towards the vehicle rear side from the outer peripheral surface 55B. The length in the second axial direction x of the other second rotation shaft 52 is set longer than that of the one second rotation shaft 52. The second rotation shafts 52 are fixed to the spider 55 in the same way as the first rotation shafts 51.

This pair of second rotation shafts 52 are supported in a central portion of the top plate portion 212 via a pair of second supporting portions 54 that are provided apart from each other in the second axial direction x.

More specifically, the one second rotation shaft 52 is disposed on the vehicle front side of the spider 55, and is fitted inside a bearing 54A that is fixed to one first supporting portion 54 of this pair that is disposed facing the outer peripheral surface 55A. The other second rotation shaft 52 is disposed on the vehicle rear side of the spider 55, and is fitted inside a bearing 54B that is fixed to the other second supporting portion 54 that is disposed facing the outer peripheral surface 55B.

The universal coupling 5 that is formed in this manner enables the vehicle body 3 to rotate (i.e., to pivot) relative to the vehicle chassis 2 around the first rotation shafts 51, and also enables the vehicle body 3 to rotate (i.e., to pivot) relative to the vehicle chassis 2 around the second rotation shafts 52. Accordingly, the number of kinematic pairs of the universal coupling 5 is set to two.

The first rotation shafts 51, the second rotation shafts 52, and the spider 55 of the are all made of, for example, metal material having a high mechanical strength.

Moreover, in the present exemplary embodiment, the first rotation shafts 51 and the second rotation shafts 52 of the universal coupling 5 are set on the same horizontal plane, however, it is also possible for the first rotation shafts 51 to instead be disposed on the vehicle lower side of the second rotation shafts 52, and for the first rotation shafts 51 and the second rotation shafts 52 to be placed in skew positions.

(4) Structure of a Locking Device 7

As is shown in FIG. 5A and FIG. 5B, a locking device 7 is formed so as to include first locking device 71 that are fitted onto the first rotation shafts 51 of the universal coupling 5, and second locking device 72 that are fitted onto the second rotation shafts 52 thereof. In addition, the locking device 7 is also provided with a lock operating unit 73 that operates the first locking devices 71 and the second locking devices 72.

First locking device 71 is formed so as to include a flange coupling 711, a brake plate (i.e., a disc) 712, and a brake caliper 713.

The flange coupling 711 is fixed to an end portion of the other first rotation shaft 51 that protrudes towards the left side in the vehicle width direction beyond the first supporting portion 53, and forms a structure that connects the brake plate 712. For this connection, fastening components such as nuts and bolts are used.

The brake plate 712 extends from the connection portion with the flange coupling 711 towards the vehicle rear side, and a plate thickness direction thereof extends in the vehicle width direction. When looked at in a vehicle side view (see a brake plate 722 shown in FIG. 5B), the brake plate 712 is formed in a fan shape from a metal plate material. A range of rotation of the first rotation shaft 51 is limited to an angular range within a maximum angle, for example, of 30 degrees. Because of this, instead of a circular shape, it is sufficient for the brake plate 712 to have a fan shape whose pivot range around the first rotation shaft 51 extends from the same angle as the rotation range of the first rotation shaft 51 to twice this angle.

The brake caliper 713 is formed so as to sandwich the extended portion of the brake plate 712 from both sides via brake pads 714. In other words, the brake caliper 713 sandwiches the brake plate 712, and locks the rotation of the brake plate 712 around the first rotation shaft 51 by generating friction between the brake plate 712 and the brake pads 714. The brake caliper 713 is attached to the vehicle main body 31 via a bracket 715. For this attachment, fastening components such as nuts and bolts are used.

Second locking device 72 is formed in the same way as the first locking device 71, and is formed so as to include a flange coupling 721, a brake plate 722, and a brake caliper 723.

The flange coupling 721 is fixed to an end portion of the other second rotation shaft 52 that protrudes towards the vehicle rear side beyond the second supporting portion 54, and forms a structure that connects the brake plate 722.

The brake plate 722 extends from the connection portion with the flange coupling 721 towards the right side in the vehicle width direction, and a plate thickness direction thereof extends in the vehicle front-rear direction. When looked at in a vehicle rear view, the brake plate 712 is formed from a fan-shaped metal plate material in the same way as the brake plate 712.

The brake caliper 723 is formed so as to sandwich the extended portion of the brake plate 722 from both sides via brake pads 724. In other words, the brake caliper 723 sandwiches the brake plate 722, and locks the rotation of the brake plate 722 around the second rotation shaft 52 by generating friction between the brake plate 722 and the brake pads 724. The brake caliper 723 is attached to the top plate portion 212 via a bracket 725.

The lock operating unit 73 is shown in simplified form as a block in FIG. 5A, and, in the present exemplary embodiment, the lock operating unit 73 is formed as a hydraulic lock operating portion or as a mechanical lock operating portion.

Although not shown in the drawings, a hydraulic lock operating portion is formed so as to include a brake lever, a master cylinder, and brake hoses that connect the master cylinder to the brake caliper 713 and the brake caliper 723. The brake lever and the master cylinder are fitted onto the handlebar 32 shown in FIG. 1 and the like. When a passenger grips the brake lever, brake fluid inside the master cylinder is compressed. The brake fluid then compresses the pistons inside each of the brake caliper 713 and the brake caliper 723 through the brake hoses. As a result, the brake pads 714 are pressed against the brake plate 712 so that friction is generated between the two. In the same way, the brake pads 724 are pressed against the brake plate 722 so that friction is generated between the two.

In a mechanical lock operating portion, a wire and lever principle is used to transmit force from the brake lever of the hydraulic lock operating portion to the brake pads.

Figure 6:
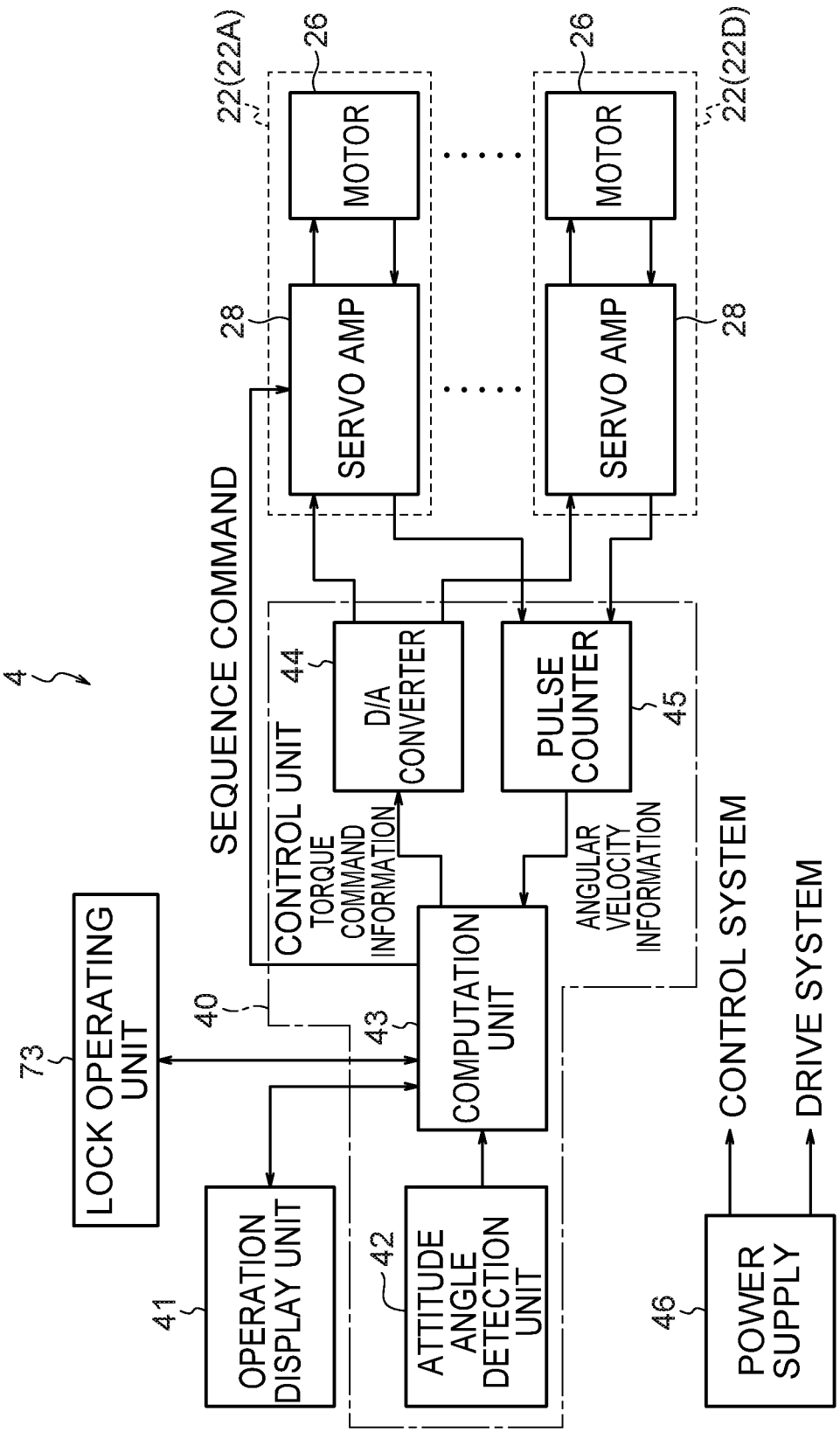
FIG. 6 is a block diagram illustrating an attitude stabilizing system incorporated into the omnidirectional moving device shown in FIG. 1.

Moreover, as is shown in FIG. 5A and FIG. 6, the lock operating unit 73 is connected to a computation unit 43 that forms part of the attitude stabilizing system 4 (described below). A structure is employed in the lock operating unit 73 such that, when movement of the vehicle chassis 2 is stopped, a signal indicating a locking operation is output to the computation unit 43. In other words, the locking device 7 is formed so as to make it possible for the attitude of the vehicle body 3 to be changed when the vehicle chassis 2 is moving, and so as to lock the attitude of the vehicle body 3 when movement of the vehicle chassis 2 is stopped, and also so as to stop movement of the vehicle chassis 2 via the computation unit 43.

Furthermore, the locking device 7 is formed such that, when the vehicle chassis 2 is in a stopped state, a signal indicating a locking operation is output from the computation unit 43 to the lock operating unit 73. As a result, the locking device 7 is able to lock the attitude of the vehicle body 3 when the vehicle chassis 2 is in a stopped state.

Note that it is also possible for the lock operating unit 73 to be a foot brake type of lock operating unit that is installed in the foot placement portion 33 shown in FIG. 1 and the like instead of being a brake lever type of lock operating unit. Moreover, it is also possible for the lock operating unit 73 to be an electromagnetic type of lock operating unit that moves the brake pads 714 and the brake pads 724 using electromagnetism.

Furthermore, a pair of the first locking devices 71 of the locking device 7 may be attached to each of the two end portions of the first rotation shafts 51, and in the same way, a pair of the second locking devices 72 thereof may be attached to each of the two end portions of the second rotation shafts 52. In this case, the braking force to lock the attitude of the vehicle body 3 can be improved.

(5) Structure of the Attitude Stabilizing System

The attitude stabilizing system 4 is formed so as to include the drive units 22 shown in FIG. 1 through FIG. 4, and the control unit 40 shown in FIG. 6. The control unit 40 is formed so as to include an angle detection portion, an attitude angle detection portion 42, and the computation unit 43. The control unit 40 is additionally provided with a digital/analog converter (D/A converter) 44. A majority of the component elements of the control unit 40 are installed in the vehicle main body 31 shown in FIG. 1 and FIG. 2A through FIG. 2C, and are housed inside the vehicle body cover 35.

The attitude stabilizing system 4 is further provided with both an operation display unit 41 and a power supply 46. The attitude stabilizing system 4 is able to cause the vehicle chassis 2 to travel while keeping the attitude of the vehicle body 3 stable.

More specifically, although the angle detection portion is not denoted by a symbol, as is shown in FIG. 6, it is formed so as to include a sensor that is attached to the motor 26, a servo amp 28, and a pulse counter 45. An encoder that detects a rotation speed and position of the rotation shaft of the motor 26, or a resolver that detects a rotation angle of the rotation shaft is used for the sensor. The servo amp 28 amplifies signals output from the sensor, and then outputs them to the pulse counter 45. The pulse counter 45 creates rotation angle information by counting a number of rotations per unit time of the rotation shaft, and outputs this rotation angle information to the computation unit 43.

The attitude angle detection portion 42 shown in FIG. 6 is installed in the vehicle main body 31. For example, an inertial measurement unit (IMU) is used for the attitude angle detection portion 42. The attitude angle detection portion 42 acquires attitude angle information by detecting the attitude angle of the vehicle body 3, and additionally acquires angular velocity information by detecting the angular velocity that accompanies a change in the attitude angle around each axis of the vehicle body 3.

Here, attitude angle information and angular velocity information that are based respectively on the attitude angle and angular velocity of the vehicle body 3 when this rotates around the first rotation shafts 51 of the universal coupling 5, and the attitude angle and angular velocity of the vehicle body 3 when this rotates around the second rotation shafts 52 thereof are acquired by the attitude angle detection portion 42.

The computation unit 43 calculates the operating state of the vehicle body 3 so as to maintain the stability of the attitude of the vehicle body 3 relative to the vehicle chassis 2, and controls the rotation of the wheels 23 via the servo amp 28 based on the calculation results, and creates torque command information that causes the vehicle chassis 2 to run while keeping the attitude of the vehicle body 3 stable. This torque command information is output to the digital/analog converter 44. For example, a personal computer such as a mini-ITX Standard compliant motherboard is used for the computation unit 43. The specific control method is described below.

The digital/analog converter 44 acquires the torque command information. This torque command information is converted from digital information into analog information in the digital/analog converter 44. The torque command information that has been converted into analog information is then output to the servo amp 28, and the servo amp 28 controls the rotation of the motor 26 based on the torque command information. The computation unit 43 also outputs sequence command information to the servo amp 28.

The operation display unit 41 provides displays of startup and end operations of the attitude stabilizing system 4, and of the operating state of the attitude stabilizing system 4, and the like.

The power supply 46 which can be freely attached and removed is mounted in the attitude stabilizing system 4. A secondary cell, more specifically, a battery is used for the power supply 46. The power supply 46 is formed so as to include a secondary cell that supplies power to the control system, and a secondary cell that supplies power to the drive system. More specifically, the control system includes the attitude angle detection portion 42, the operation display unit 41, the computation unit 43, the digital/analog converter 44, and the pulse counter 45. In contrast, the drive system includes the servo amp 28 and the motor 26. The power supply 46 is housed within the vehicle body cover 35.

[Attitude Control Method for an Omnidirectional Moving Device]

Figure 7A:
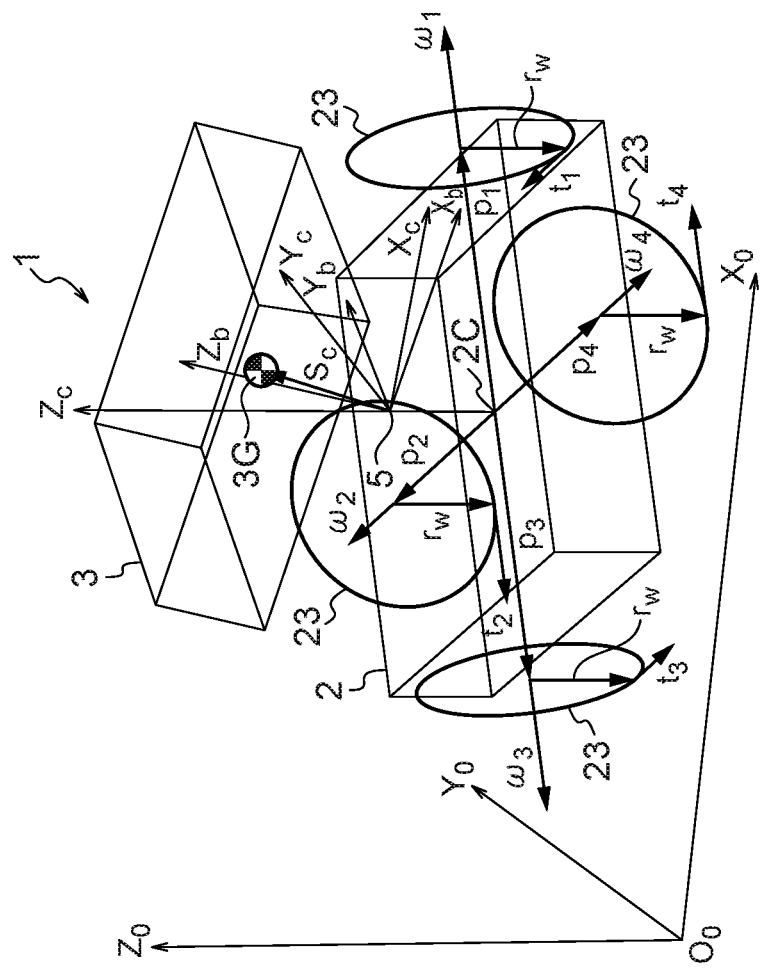
FIG. 7A is a schematic perspective view showing a model of the omnidirectional moving device according to the first exemplary embodiment in a three-dimensional coordinate system.
Figure 7B:
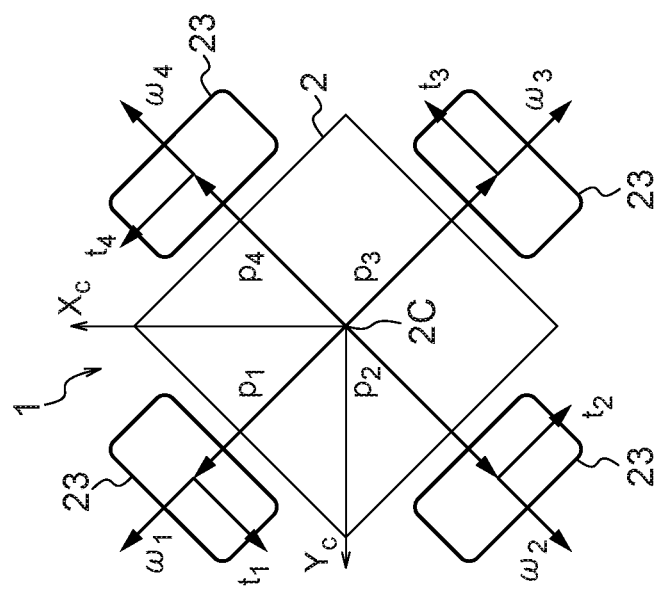
FIG. 7B is a schematic top view showing a model of the vehicle chassis and wheels of the omnidirectional moving device according to the first exemplary embodiment.
Figure 8:
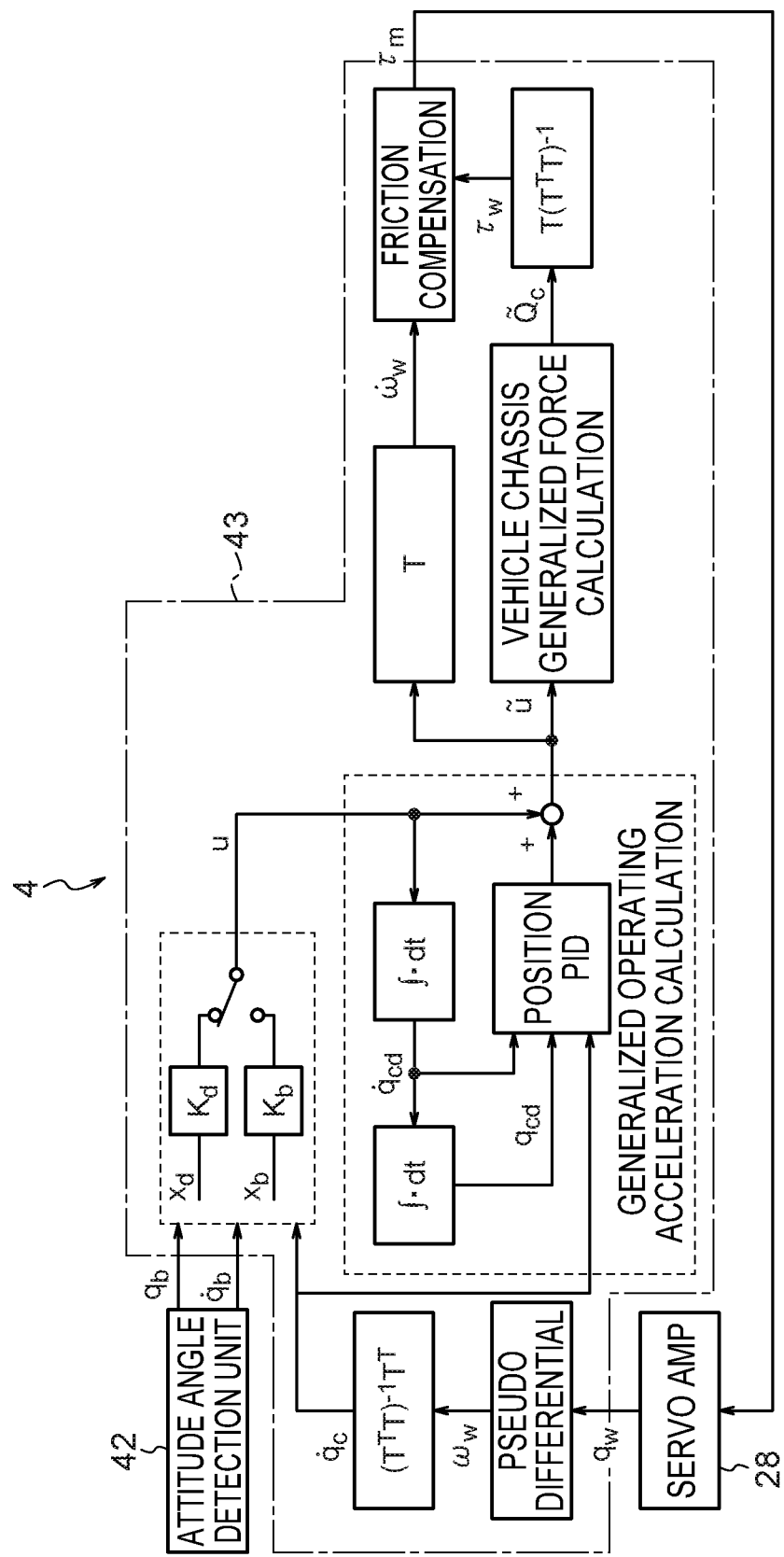
FIG. 8 is a block diagram illustrating an algorithm of the attitude stabilizing system shown in FIG. 6.
Figure 9:
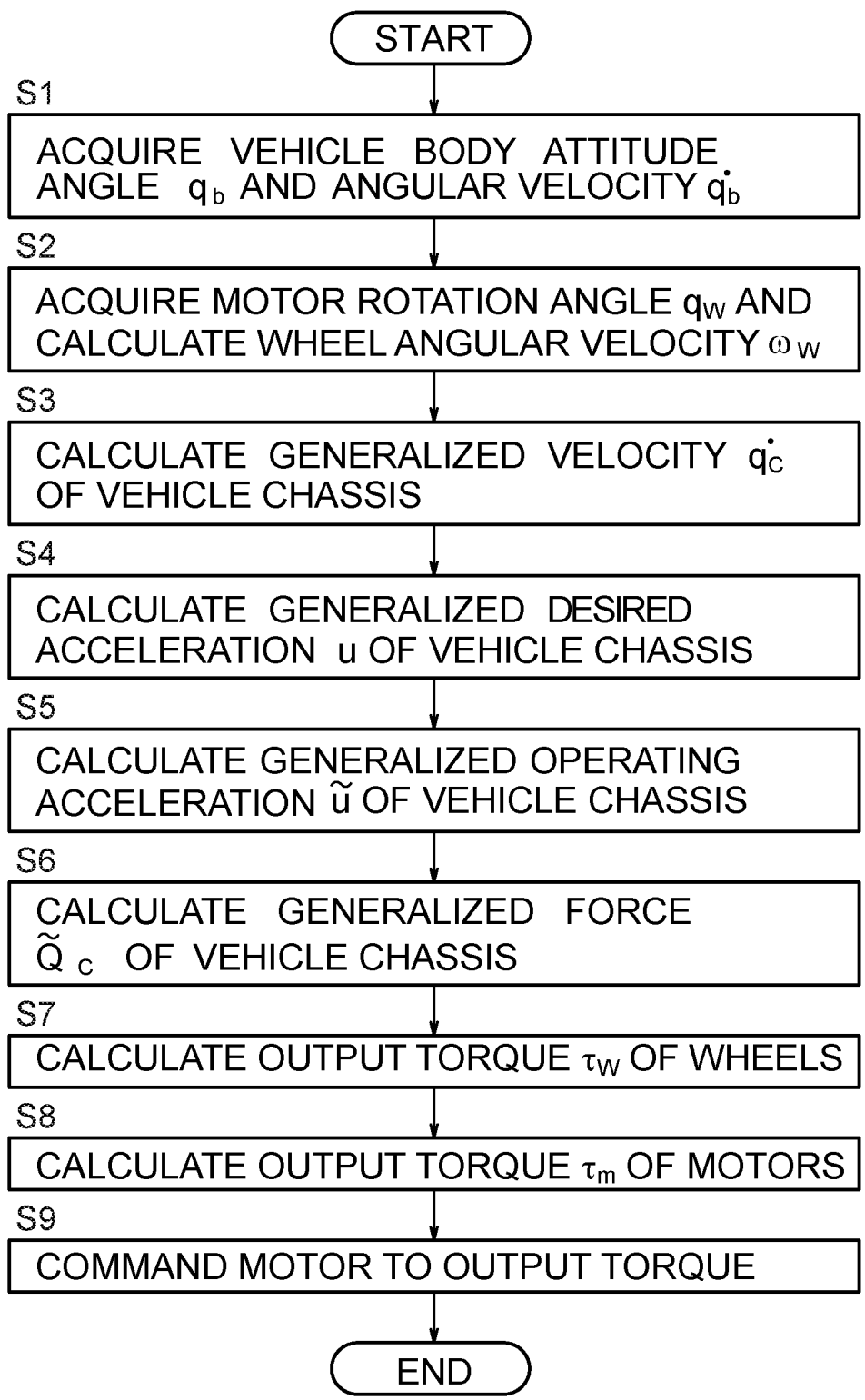
FIG. 9 is a flowchart illustrating an attitude control method of the attitude stabilizing system shown in FIG. 6.

An attitude control method for the above-described omnidirectional moving device 1 is as follows. Here, FIG. 7A is a schematic perspective view showing a model of the omnidirectional moving device 1 according to the first exemplary embodiment in a three-dimensional coordinate system, and FIG. 7B is a schematic top view showing a model of the vehicle chassis 2 and wheels (i.e., Omni wheels) 23 of the omnidirectional moving device 1. FIG. 8 is a block diagram illustrating an algorithm to achieve the attitude control method. FIG. 9 is a flowchart illustrating an attitude control method. Note that FIG. 1 through FIG. 6 will be used where appropriate in order to describe this attitude control method.

(1) Kinematics of the Vehicle Chassis 2 of the Omnidirectional Moving Device 1

Firstly, kinematics of the vehicle chassis 2 and the vehicle body 3 of the omnidirectional moving device 1 shown in FIG. 1 through FIG. 6 will be described using FIG. 7A. Here, the three-dimensional coordinates are shown by $X_0$ for the X axis, $Y_0$ for the Y axis, and $Z_0$ for the Z axis.

In the omnidirectional moving device 1, the axis in the vehicle front-rear direction of the vehicle chassis 2 is defined as an $X_c$ axis, an axis in the vehicle width direction of the vehicle chassis 2 is defined as a $Y_c$ axis, and an axis in the up-down direction of the vehicle chassis 2 passing through the center of the universal coupling 5 is defined as a $Z_c$ axis.

A velocity vector $v_c$ of the position of the universal coupling 5 that is attached to the vehicle chassis 2 is shown by the following Formula (1).

[Formula 1]

$$v_c = [v_x, v_y, 0]^T \quad (1)$$

An angular velocity vector $\omega_c$ of the vehicle chassis 2 is shown by the following Formula (2).

[Formula 2]

$$\omega_c = [0, 0, \omega_z]^T \quad (2)$$

A position vector $p_k$ of a center of a k-th wheel 23 taking a center 2C of the vehicle chassis 2 as a start point is shown by the following Formula (3). Here, in the present exemplary embodiment, because the four drive units 22A through 22D are provided, and because the four wheels 23 are provided, k is 1, ..., 4. Regarding the wheels 23, the first Omni wheel 231 and the second Omni wheel 232 show in FIG. 4D are regarded as being one Omni wheel.

[Formula 3]

$$p_k = [p_{kx}, p_{ky}, 0]^T \quad (3)$$

An angular velocity vector of the k-th wheel 23 is taken as $\omega_k$, and the angular velocity vector $\omega_k$ is taken as the size ($|\omega_k|$) of the angular velocity vector $\omega_k$.

A position vector of a ground contact point of the wheel 23 that takes the center of the wheel 23 as a start point is shown by the following Formula (4). $r_w$ is the radius of the wheel 23.

[Formula 4]

$$r_w = [0, 0, -r_w]^T \quad (4)$$

A unit vector (i.e., an Omni wheel tangent vector) $t_k$ that is parallel to the rotation axis b of the roller 231B or the roller 232B (hereinafter, abbreviated simply to the 'roller 23B') taking the ground contact point of the k-th wheel 23 as a start point is shown by the following Formula (5).

[Formula 5]

$$t_k = [t_{kx}, t_{ky}, 0]^T \quad (5)$$

Using the above definitions, a velocity $v_k$ of the ground contact point of the k-th wheel 23 is shown by the following Formula (6). Here, in Formula (6) below, the symbol 'x' represents a vector product.

[Formula 6]

$$v_k = v_c + \omega_c \times p_k + \omega_k \times r_w \quad (6)$$

Assuming that the roller 23B of the k-th wheel 23 is in ground contact with a ground contact point, and the roller 23B is not sliding in the axial direction thereof, then the relationship shown in Formula (7) below is established between the velocity $v_k$ and the unit vector $t_k$. Here, in Formula (7), the symbol '·' denotes a scalar product.

[Formula 7]

$$v_k \cdot t_k = 0 \quad (7)$$

If Formula (6) is substituted into Formula (7), and if the fact that the angular velocity vector $\omega_c$, the position vector $p_k$, the angular velocity vector $\omega_k$ and the unit vector $t_k$ are orthogonal to the Z axis $Z_0$, the fact that the angular velocity vector $\omega_c$ and the radius $r_w$ are parallel with the Z axis $Z_0$, and, additionally, the fact that the angular velocity vector $\omega_k$ and the unit vector $t_k$ are mutually orthogonal are considered, then the following Formula (8) is obtained.

[Formula 8]

$$t_{kx} v_x + t_{ky} v_y + (p_{kx} t_{ky} - p_{ky} t_{kx}) \omega_z = -r_w \omega_k \quad (8)$$

If Formula (8) is applied to each of k=1, ..., 4 and combined into a single formula, then the following Formula (9) is obtained.

[Formula 9]

$$\begin{bmatrix} t_{1x} & t_{1y} & p_{1x}t_{1y} - p_{1y}t_{1x} \\ t_{2x} & t_{2y} & p_{2x}t_{2y} - p_{2y}t_{2x} \\ t_{3x} & t_{3y} & p_{3x}t_{3y} - p_{3y}t_{3x} \\ t_{4x} & t_{4y} & p_{4x}t_{4y} - p_{4y}t_{4x} \end{bmatrix} \begin{bmatrix} v_x \\ v_y \\ \omega_z \end{bmatrix} = -r_w \begin{bmatrix} \omega_1 \\ \omega_2 \\ \omega_3 \\ \omega_4 \end{bmatrix} \quad (9)$$

In particular, when the position vector $p_k$ and the unit vector $t_k$ are mutually orthogonal (i.e., when the position vector $p_k$ and the angular velocity vector $\omega_k$ are mutually parallel), the above Formula (9) is shown by the following Formula (10).

[Formula 10]

$$\begin{bmatrix} t_{1x} & t_{1y} & p_1 \\ t_{2x} & t_{2y} & p_2 \\ t_{3x} & t_{3y} & p_3 \\ t_{4x} & t_{4y} & p_4 \end{bmatrix} \begin{bmatrix} v_x \\ v_y \\ \omega_z \end{bmatrix} = -r_w \begin{bmatrix} \omega_1 \\ \omega_2 \\ \omega_3 \\ \omega_4 \end{bmatrix} \quad (10)$$

A generalized velocity vector of the vehicle chassis 2, a vector $\omega_w$ obtained by combining the angular velocities of the wheels 23, and a velocity transfer matrix T are each defined using the following Formula (11) through Formula (13).

[Formula 11]

Generalized Velocity $$\dot{q}_c := \begin{bmatrix} v_x \\ v_y \\ \omega_z \end{bmatrix} \quad (11)$$

[Formula 12]

Vector $$\omega_w := \begin{bmatrix} \omega_1 \\ \omega_2 \\ \omega_3 \\ \omega_4 \end{bmatrix} \quad (12)$$

[Formula 13]

Velocity transfer matrix $$T := -\frac{1}{r_w} \begin{bmatrix} t_{1x} & t_{1y} & p_{1x}t_{1y} - p_{1y}t_{1x} \\ t_{2x} & t_{2y} & p_{2x}t_{2y} - p_{2y}t_{2x} \\ t_{3x} & t_{3y} & p_{3x}t_{3y} - p_{3y}t_{3x} \\ t_{4x} & t_{4y} & p_{4x}t_{4y} - p_{4y}t_{4x} \end{bmatrix} \quad (13)$$

Using the above definitions, a relationship between the angular velocities $\omega_w$ of the wheels 23 and the generalized velocity vector of the vehicle chassis 2 is shown by the following Formula 14. Here, the generalized velocity vector is a time derivative of the generalized coordinate $q_c$ of the vehicle chassis 2.

[Formula 14]

$$\omega_w = T\dot{q}_c \tag{14}$$

The above Formula (14) is an overdetermined system of the generalized velocity vector, and a least squares solution of the generalized velocity vector is provided by the following Formula (15) using a generalized inverse matrix of the velocity transfer matrix T.

[Formula 15]

$$\dot{q}_c = (T^T T)^{-1} T^T \omega_w \tag{15}$$

$T^T$ shows a transpose matrix of the velocity transfer matrix T. If the placement of the wheels 23 is appropriate, then the inverse matrix of $T^T T$ exists.

Based on the principle of virtual work, a vector $\tau_w$ obtained by combining the torques of the wheels 23, and a generalized force vector of the vehicle chassis 2 shown by the following Formula (16) satisfy a relationship shown in the following Formula (17).

[Formula 16]

$$Q_c = [f_x, f_y, \tau_z]^T \tag{16}$$

[Formula 17]

$$Q_c = T^T \tau_w \tag{17}$$

Here, a unit vector $f_x$ is the propulsive force in the $X_c$ axial direction of the vehicle chassis 2, $f_y$ is the propulsive force in the $Y_c$ axial direction of the vehicle chassis 2, and $\tau_z$ is the turning torque around the $Z_c$ axis of the vehicle chassis 2.

The above Formula (17) is an underdetermined system of the vector $\tau_w$, and a minimum norm solution of the vector $\tau_w$ is provided by the following Formula (18) using a generalized inverse matrix of $T^T$.

[Formula 18]

$$\tau_w = T(T^T T)^{-1} Q_c \tag{18}$$

For example, as is shown in FIG. 7B, if the distances p from the center 2C of the vehicle chassis 2 to each wheel 23 are all equal, and each wheel 23 is arranged equidistantly from, and at an angle of 90 degrees relative to, the other wheels 23, then the respective matrix components of the velocity transfer matrix T denoted in the above Formula (13) become the values shown in the following Formula (19).

[Formula 19]

$$t_{1x} = t_{2x} = -\frac{1}{\sqrt{2}}, \quad t_{3x} = t_{4x} = \frac{1}{\sqrt{2}}, \tag{19}$$
$$t_{1y} = t_{4y} = \frac{1}{\sqrt{2}}, \quad t_{2y} = t_{3y} = -\frac{1}{\sqrt{2}}$$

If these values are substituted in the above Formula (13), then as is shown in the following Formula (20), the velocity transfer matrix T can be calculated.

[Formula 20]

$$T = \frac{1}{r_w} \begin{bmatrix} \frac{1}{\sqrt{2}} & -\frac{1}{\sqrt{2}} & -p \\ \frac{1}{\sqrt{2}} & \frac{1}{\sqrt{2}} & -p \\ -\frac{1}{\sqrt{2}} & \frac{1}{\sqrt{2}} & -p \\ -\frac{1}{\sqrt{2}} & -\frac{1}{\sqrt{2}} & -p \end{bmatrix} \tag{20}$$

(2) Kinematics of the Vehicle Body 3 of the Omnidirectional Moving Device 1

In the omnidirectional moving device 1, an axis in the vehicle front-rear direction of the vehicle body 3 is defined as an $X_b$ axis, an axis in the vehicle width direction of the vehicle body 3 is defined as a $Y_b$ axis, and an axis in the up-down direction of the body 3 is defined as a $Z_b$ axis.

The vehicle body 3 is connected via the universal coupling 5 to the vehicle chassis 2 of the omnidirectional moving device 1 which moves (i.e., travels) within the horizontal plane of the $X_0$ axis-$Y_0$ axis. The vehicle body 3 is formed so as to be able to tilt relative to the vehicle chassis 2 via the universal coupling 5 while rotating freely around the Y axis (i.e., the first axial direction y) and around the X axis (i.e., the second axial direction x). In addition, the vehicle body 3 is formed so as to turn around the Z axis while tracking the turning of the vehicle chassis 2.

An attitude matrix $R_b$ of the vehicle body 3 is shown by the following Formula (21) using attitude angles relating to these three axes.

[Formula 21]

$$R_b = Rot(Z,\alpha) Rot(Y,\beta) Rot(X,\gamma) \tag{21}$$

$Rot(A,\theta)$ shows a rotational transformation matrix when a rotation is made around axis A by angle $\theta$. Here, $\alpha$, $\beta$, $\gamma$ are respectively a yaw angle, a pitch angle, and a roll angle.

A center of gravity 3G of the vehicle body 3 shown in FIG. 7A is a constant vector shown by the following Formula (22) in the coordinate system fixed to the vehicle body 3. This constant vector is shown by the following Formula (23) in a reference coordinate system.

[Formula 22]

$$^b s_b = \begin{bmatrix} s_{bx} \\ s_{by} \\ s_{bz} \end{bmatrix} \tag{22}$$

[Formula 23]

$$s_b = R_b \, ^b s_b \tag{23}$$

Because the angular velocity $\omega_b$ is generated by rotation around the X axis, around the Y axis, and around the Z axis, as is shown in the following Formula (24), the angular velocity $\omega_b$ can be calculated.

[Formula 24]

$$\omega_b = \begin{bmatrix} 0 \\ 0 \\ \dot{\alpha} \end{bmatrix} + Rot(Z,\alpha) \begin{bmatrix} 0 \\ \dot{\beta} \\ 0 \end{bmatrix} + Rot(Z,\alpha) Rt(Y,\beta) \begin{bmatrix} \dot{\gamma} \\ 0 \\ 0 \end{bmatrix} \tag{24}$$

The turning of the vehicle body 3 is equal to the turning of the vehicle chassis 2, and is shown by the following Formula (25).

$$\dot{\alpha} = \omega_c \tag{25}$$

The velocity $v_b$ of the vehicle body 3 is provided by the following Formula (26).

$$v_b = v_c + \omega_b \times s_b \tag{26}$$

(3) Dynamics of the Omnidirectional Moving Device 1

1. Derivation of an Equation of Motion

In the omnidirectional moving device 1, the mass of the vehicle chassis 2 is defined as $m_c$, and a moment of inertia around the Z axis of the vehicle chassis 2 is defined as $J_{cz}$. The kinetic energy of the vehicle chassis 2 is the sum of the kinetic energy of a translational motion of the vehicle chassis 2, and the kinetic energy of a rotational motion thereof, and is shown by the following Formula (27).

[Formula 27]

$$K_c = \tfrac{1}{2} m_c v_c^T v_c + \tfrac{1}{2} J_{cz} \omega_c^T \omega_c = \tfrac{1}{2} m_c (v_x^2 + v_y^2) + \tfrac{1}{2} J_{cz} \omega_z^2 \tag{27}$$

The mass of the vehicle body 3 is defined as $m_b$. In a coordinate system that is fixed to the vehicle body 3, an inertia tensor around the center of gravity 3G of the vehicle body 3 becomes a constant matrix, and is shown by the following Formula (28).

[Formula 28]

$$^bJ_b = \begin{bmatrix} J_{bxx} & J_{bxy} & J_{bxz} \\ J_{bxy} & J_{byy} & J_{byz} \\ J_{bxz} & J_{byz} & J_{bzz} \end{bmatrix} \tag{28}$$

The kinetic energy of the vehicle body 3 is the sum of the kinetic energy of a translational motion of the vehicle body 3, and the kinetic energy of a rotational motion thereof, and is shown by the following Formula (29).

[Formula 29]

$$K_b = \tfrac{1}{2} m_b v_b^T v_b + \tfrac{1}{2} (R_b^{-1} \omega_b)^{Tb} J_b (R_b^{-1} \omega_b) \tag{29}$$

The potential energy of the vehicle body 3 is provided by the following Formula (30). Here, g is a gravity acceleration vector.

[Formula 30]

$$U_b = -m_b s_b^T g \tag{30}$$

Using a Lagrangian of the entire omnidirectional moving device 1 shown in the following Formula (31), an equation of motion of the omnidirectional moving device 1 is provided by the following Formula (32).

[Formula 31]

$$L := K_c + K_b - U_b \tag{31}$$

[Formula 32]

$$\begin{cases} \dfrac{d}{dt}\left(\dfrac{\partial L}{\partial v_x}\right) = f_x \\ \dfrac{d}{dt}\left(\dfrac{\partial L}{\partial v_y}\right) = f_y \\ \dfrac{d}{dt}\left(\dfrac{\partial L}{\partial \omega_z}\right) = \tau_z \\ \dfrac{d}{dt}\left(\dfrac{\partial L}{\partial \dot{\beta}}\right) - \dfrac{\partial L}{\partial \beta} = 0 \\ \dfrac{d}{dt}\left(\dfrac{\partial L}{\partial \dot{\gamma}}\right) - \dfrac{\partial L}{\partial \gamma} = 0 \end{cases} \tag{32}$$

Here, $f_x$ is the propulsive force in the vehicle front-rear direction of the vehicle chassis 2, $f_y$ is the propulsive force in the vehicle front-rear direction of the vehicle chassis 2, and $\tau_z$ is the turning torque of the vehicle chassis 2.

In the reference coordinate system, positional coordinates in a horizontal direction of the universal coupling 5 of the vehicle chassis 2 are defined as (x,y).

If generalized coordinates for the omnidirectional moving device 1 shown in the following Formula (33) are selected, then the equation of motion shown in the above Formula (32) is represented by the following Formula (34).

[Formula 33]

$$q = [x, y, \alpha, \beta, \gamma]^T \tag{33}$$

[Formula 34]

$$M(q)\ddot{q} + h(q,\dot{q}) = Q \tag{34}$$

M(q): Inertia matric h(q,q̇): Vector containing the effects of centripetal force, Coriolis force, and gravity $Q = [f_x, f_y, \tau_z, 0, 0]^T$: Generalized force vector 2. Linear Approximation Model In the vicinity of the state of equilibrium of the vehicle body 3 shown in the following Formula (35), a linear approximation model of the equation of motion shown in the above Formula (34) is shown by the following Formula (36).

[Formula 35]

$$\beta = 0, \gamma = 0, \dot{q} = 0 \tag{35}$$

[Formula 36]

$$\begin{bmatrix} M_{11} & M_{12} \\ M_{12}^T & M_{22} \end{bmatrix} \begin{bmatrix} \ddot{q}_c \\ \ddot{q}_b \end{bmatrix} + \begin{bmatrix} O_{3\times 2} \\ H_2 \end{bmatrix} q_b = \begin{bmatrix} I_3 \\ O_{2\times 3} \end{bmatrix} Q_c \tag{36}$$

$q_c = [x, y, \alpha]^T$: generalized coordinate of the vehicle chassis 2

$q_b = [\beta, \gamma]^T$: generalized coordinate of the vehicle body 3

$O_{n \times m}$: $n \times m$ zero matrix $I_n$: nth order identity matrix

Submatrices contained in the equation of motion shown in the above Formula (36) are as is shown in the following Formula (37) through Formula (40).

[Formula 37]

$$M_{11} = \begin{bmatrix} m_b + m_c & 0 & -m_b s_{by} \\ 0 & m_b + m_c & m_b s_{bx} \\ -m_b s_{by} & m_b s_{bx} & J_{bx} + J_{cz} + m_b(s_{bx}^2 + s_{by}^2) \end{bmatrix} \quad (37)$$

[Formula 38]

$$M_{12} = \begin{bmatrix} m_b s_{bz} & 0 \\ 0 & -m_b s_{bz} \\ J_{byz} - m_b s_{by} s_{bz} & J_{bxz} - m_b s_{bx} s_{bz} \end{bmatrix} \quad (38)$$

[Formula 39]

$$M_{22} = \begin{bmatrix} J_{byy} + m_b(s_{bx}^2 + s_{bz}^2) & J_{bxy} - m_b s_{bx} s_{by} \\ J_{bxy} - m_b s_{bx} s_{by} & J_{bxx} + m_b(s_{by}^2 + s_{bz}^2) \end{bmatrix} \quad (39)$$

[Formula 40]

$$H_2 \begin{bmatrix} -m_b s_{bz} q & 0 \\ 0 & -m_b s_{bz} q \end{bmatrix} \quad (40)$$

An input of the linear approximation model shown in the above Formula (36) is a generalized force $Q_c$ of the vehicle chassis 2. If the above Formula (36) is rewritten taking a generalized acceleration of the vehicle chassis 2 as a new input (i.e., a generalized desired acceleration) u, then the linear approximation model is shown by the following Formula (41).

[Formula 41]

$$\begin{bmatrix} I_3 & O_{3\times 2} \\ O_{2\times 3} & M_{22} \end{bmatrix} \begin{bmatrix} \ddot{q}_c \\ \ddot{q}_b \end{bmatrix} + \begin{bmatrix} O_{3\times 2} \\ H_2 \end{bmatrix} \dot{q}_b = \begin{bmatrix} I_3 \\ -M_{12}^T \end{bmatrix} u \quad (41)$$

$\ddot{q}_c$: generalized acceleration of the vehicle chassis 2

$\ddot{q}_b$: generalized acceleration of the vehicle body 3

The generalized force $Q_c$ and the new input u satisfy a relationship shown by the following Formula (42).

[Formula 42]

$$Q_c = (M_{11} - M_{12} M_{22}^{-1} M_{12}^T) u - M_{12} M_{22}^{-1} H_2 \dot{q}_b \quad (42)$$

In order to control movements of the omnidirectional moving device 1 using the new linear approximation model shown in the above Formula (41), a new input u that enables the linear approximation model to be stabilized is determined based on state quantities of the omnidirectional moving device 1 shown in the following Formula (43).

[Formula 43]

$$(q_c, q_b, \dot{q}_c, \dot{q}_b) \quad (43)$$

Based on this new input u, the generalized force $Q_c$ generated by the vehicle chassis 2 is calculated using the above Formula (42). Based on the result of this calculation, the torque generated by the wheels 23 is determined via calculation using the above Formula (18).

(4) Control Method for the Omnidirectional Moving Device 1

1. Stabilization of the Vehicle Body

In the omnidirectional moving device 1, because the vehicle body 3 is connected to the vehicle chassis 2 using the universal coupling 5, when traveling, it is necessary for the vehicle chassis 2 to make appropriate movements in order to maintain the stability of the attitude of the vehicle body 3. Because of this, in the present exemplary embodiment, the attitude stabilizing system 4 is incorporated into the omnidirectional moving device 1.

In order to determine an appropriate movement for the vehicle chassis 2, a subspace of the state quantities of the vehicle body 3 shown in the following Formula (44) is used as a quantity, and a subsystem of the linear approximation model shown in the above Formula (41) is created.

[Formula 44]

$$x_d := \begin{bmatrix} q_b \\ \dot{\alpha} \\ \dot{q}_b \end{bmatrix} \quad (44)$$

This subsystem is shown by the following Formula (45).

[Formula 45]

$$\dot{x}_d = A_d x_d + B_d u \quad (45)$$

The input u that stabilizes the subsystem shown in the above Formula (45), in other words, the general velocity of the vehicle chassis 2 is calculated.

Matrices in the subsystem are shown by the following Formula (46). Here, $O_n$ refers to an n-th order square zero matrix.

[Formula 46]

$$A_d := \begin{bmatrix} O_2 & O_{2\times 1} & I_2 \\ O_{1\times 2} & & \\ -M_{22}^{-1} H_2 & & O_3 \end{bmatrix}, \quad B_d := \begin{bmatrix} O_{2\times 3} \\ O_{1\times 2} & 1 \\ -M_{22}^{-1} & M_{12}^T \end{bmatrix} \quad (46)$$

If static stabilizing feedback control in which, as an example, a quadratic form evaluation criterion determined by a positive semi-definite weighting matrix $Q_d$ is minimized, is used for the subsystem shown in the above Formula (45), then the attitude of the vehicle body 3 can be kept stable when traveling.

Here, the quadratic form evaluation criterion is shown by the following Formula (47). In addition, the static stabilizing feedback control is shown by the following Formula (48).

[Formula 47]

$$J_d = \int_0^\infty (x_d^T Q_d x_d + u^T u) dt \quad (47)$$

[Formula 48]

$$u = K_d x_d \quad (48)$$

2. Reducing Effects on the Drive System from Friction and External Disturbances

When the wheels 23 which are capable of moving omnidirectionally are driven, it is necessary to compensate for the friction and inertial moment present within the reduction gear 24 of the drive unit 22. Furthermore, it is also necessary to reduce the effects from external disturbances.

Because of this, the input u determined by the above Formula (48) is taken as the generalized desired acceleration of the vehicle chassis 2, and new inputs obtained by applying feedback control (in this case, PID (Proportional Integral Differential) control) for the generalized coordinates of the vehicle chassis 2 to this generalized desired acceleration are used.

These new inputs (i.e., the generalized operating acceleration) is shown by the following Formula (49).

[Formula 49]

$$\bar{u} = \begin{bmatrix} u_1 + K_I \int_0^t (x_d - x)dt + K_P(x_d - x) + K_D(v_{xd} - v_x) \\ u_2 + K_I \int_0^t (y_d - y)dt + K_P(y_d - y) + K_D(v_{yd} - v_y) \\ u_3 \end{bmatrix} \quad (49)$$

Here, $K_I$, $K_P$, $K_D$ are gains of the PID control.

The $u_1$, $u_2$ and $u_3$ in the above Formula (49) are respectively a first component, a second component, and a third component of the input u. The respective target values $v_{xd}$, $x_d$, $v_{yd}$, $y_d$, x, and y are determined by the following Formula (50).

[Formula 50]

$$v_{xd} = \int_0^t u_1 dt, s_d = \int_0^t v_{xd} dt, v_{yd} = \int_0^t u_2 dt, y_d = \int_0^t v_{yd} dt, \\ x = \int_0^t v_x dt, y = \int_0^t v_y dt \quad (50)$$

From the inputs shown in the above Formula (49), the generalized force required to be generated by the vehicle chassis 2 is calculated using the following Formula (51) in the same way as the above Formula (42).

[Formula 51]

$$\bar{Q}_c = (M_{11} - M_{12}M_{22}^{-1}M_{12}^T)\bar{u} - M_{12}M_{22}^{-1}H_2 q_b \quad (51)$$

$\bar{Q}_c$: Generalized force

The torque required to be generated by each wheel 23 is calculated using the following Formula (52) based on the above Formula (18).

[Formula 52]

$$\tau_w = T(T^T T)^{-1} \bar{Q}_c \quad (52)$$

A value of an inertial moment including a rotation shaft (i.e., a rotator which is not shown in the drawings) of the motor 26 of the drive unit 22 shown in FIG. 4A, FIG. 4B, and FIG. 4D, gears (not shown in the drawings) and the output shaft 241 of the reduction gear 24, and the wheels 23, on an output side of the reduction gear 24, is defined as $J_w$. In addition, a coefficient of viscous friction is defined as $F_v$, an inertial friction torque is defined as $F_c$, and a reduction ratio of the reduction gear 24 is defined as $i_r$. The torque required to be output by the motor 26 which is driving the k-th wheel 23 is calculated using the following Formula (53).

[Formula 53]

$$\tau_{mk} = i_r \{\tau_{wk} + J_w \dot{\omega}_k + F_v \omega_k + F_c \text{sgn}(\omega_k)\} \quad (53)$$

Here, $\tau_{wk}$ is a k-th component of $\tau_w$. Moreover, sgn(·) is a sign function.

In the above Formula (53), the angular velocity of the k-th wheel 23, which is a k-th component, is calculated using the following Formula (54).

[Formula 54]

$$\dot{\omega}_w = T\bar{u} \quad (54)$$

3. Control Procedure for the Omnidirectional Moving Device 1

A control procedure for the omnidirectional moving device 1 is shown in FIG. 9. This control procedure will now be described in detail with consideration, where appropriate, to FIG. 6 and FIG. 8.

Firstly, in the attitude stabilizing system 4 of the omnidirectional moving device 1 shown in FIG. 6 and FIG. 8, the attitude angle of the vehicle body 3 and the angular velocity of the vehicle body 3 are detected using the attitude angle detection portion 42. Here, the respective symbols, symbol names, and symbol definitions are shown in the following Table (1).

TABLE 1

| Symbol | Symbol name | Symbol definition |
|---|---|---|
| $q_b$ | Attitude angle of the vehicle body 3 | |
| $\dot{q}_b$ | Angular velocity of the vehicle body 3 | |
| $q_w$ | Rotation angle of the wheel 23 | Vector that contains the rotation angle of each the wheel 23 |
| $\omega_w$ | Angular speed of the wheel 23 | |
| $\dot{q}_c$ | Generalized velocity of the vehicle chassis 2 | |
| $x_d$ | Subspace of state quantity of the vehicle chassis 2 and the vehicle body 3 | |
| u | Generalized desired acceleration | |
| $\bar{u}$ | Generalized operating acceleration | |
| $\bar{Q}_c$ | Generalized force of the vehicle chassis 2 | |
| $\dot{\omega}_w$ | Angular acceleration of the wheel 23 | |
| $\tau_w$ | Torque that the wheel 23 should generate | |
| $\tau_m$ | Output torque of the motor 26 | Vector that contains the output torque $\tau_{mk}$ of each the motor 26 |
| $q_{cd}$ | Desired position of the vehicle chassis 2 | =[$x_d$, $y_d$] |
| $\dot{q}_{cd}$ | Desired velocity of the vehicle chassis 2 | =[$v_{xd}$, $v_{yd}$] |

The attitude angle and angular velocity of the vehicle body 3 are acquired in the computation unit 43 of the attitude stabilizing system 4 (see step S1 in FIG. 9; hereinafter, the relevant steps will be abbreviated to, for example, S1).

Using the pulse counter 45 provided in the motor 26 of the drive unit 22 shown in FIG. 4A, FIG. 4B, FIG. 4D, and FIG. 6, the rotation angles of all of the wheels 23 (i.e., the rotation angles of the motors 26) are detected. The detected rotation angles are sent to the computation unit 43 as angular velocity information, and the computation unit 43 acquires this angular velocity information. In the computation unit 43, the angular velocity of the wheels 23 is then calculated based on the angular velocity information (S2).

In the computation unit 43, a generalized velocity of the vehicle chassis 2 is calculated using the above Formula (15)

based on the generalized inverse matrix of the velocity transfer matrix T, and on the angular velocity information for the wheels 23 (S3).

In the computation unit 43, based on the acquired information for the attitude angle of the vehicle body 3 and the angular velocity of the vehicle body 3, and on the information for the generalized velocity which was acquired by calculation, a subspace of the state quantities of the vehicle body 3 is formed using the above Formula (44). In the computation unit 43, using this subspace, a generalized desired acceleration is calculated using the above Formula (48) for static stabilized feedback control (S4).

Based on the calculated generalized desired acceleration information, and on the generalized velocity information, respective target values are calculated for $v_{xd}$, $x_d$, $v_{yd}$, $y_d$, x, and y using the above Formula (59) in the computation unit 43. Based on the information for these respective desired values, and on the generalized desired acceleration information, the generalized operating acceleration of the vehicle chassis 2 is calculated by the computation unit 43 using the above Formula (49) (S5).

Based on the calculated generalized desired acceleration information, and on the acquired information for the attitude angle of the vehicle body 3, the generalized force requiring to be generated by the vehicle chassis 2 is calculated by the computation unit 43 using the above Formula (51) (S6). Subsequently, using the calculated generalized force information, the output torque requiring to be generated by the wheels 23 is calculated by the computation unit 43 using the above Formula (52) (S7).

Based on the calculated generalized operating acceleration information, the angular acceleration of the wheels 23 is calculated by the computation unit 43 using the above Formula (54). Based on this information for the angular acceleration of the wheels 23, on the information for the output torque requiring to be generated by the wheels 23, and on the information for the angular velocity of the wheels 23, the output torque of the motor 26 is calculated by the computation unit 43 using the above Formula (53) (S8).

The computation unit 43 takes the output torque obtained by calculation as the torque command information, and sends this to the digital/analog converter 44 shown in FIG. 6. In the digital/analog converter 44, the torque command information is converted from digital information into analog information, and the converted torque command information is then sent to the servo amp 28.

The servo amp 28 controls the driving of the motor 26, and drives the wheels 23 to rotate so as to generate output torque.

Note that if the lock operating unit 73 of the locking device 7 shown in FIG. 5A is operated, then the attitude of the vehicle body 3 is locked by the locking device 7, and the computation unit 43 performs control to cause the servo amp 28 to stop the rotation of the wheels 23.

Operational Advantages of the Present Exemplary Embodiment

As is shown in FIG. 1 and FIG. 2, the omnidirectional moving device 1 of the present exemplary embodiment is provided with the vehicle chassis 2, and the vehicle body 3 that is mounted on top of the vehicle chassis 2. The wheels 23 are provided in the vehicle chassis 2, and the wheels 23 are capable of moving omnidirectionally.

Here, the omnidirectional moving device 1 is provided with the universal coupling 5 shown in FIG. 2B, FIG. 2C, and FIG. 3, and, in particular, with the attitude stabilizing system 4 shown in FIG. 6. Furthermore, the plurality of wheels 23 are provided in the vehicle chassis 2 shown, in particular, in FIG. 1 through FIG. 4. The universal coupling 5 connects the vehicle chassis 2 to the vehicle body 3, and enables the attitude of the vehicle body 3 relative to the vehicle chassis 2 to be changed.

If a plurality of the wheels 23 are provided, then all of these wheels 23 are in ground contact with a travel path. Because of this, the attitude of the vehicle changes to follow the slope of the road surface of the travel path. In contrast, because the vehicle body 3 is connected to the vehicle chassis 2 via the universal coupling 5, the attitude of the vehicle body 3 is not linked to the attitude of the vehicle chassis 2. In other words, because the vehicle body 3 is connected to the vehicle chassis 2 simply via the universal coupling 5, the vehicle body 3 is statically unstable relative to the vehicle chassis 2.

The attitude stabilizing system 4 moves the vehicle chassis 2 in the direction in which the attitude of the vehicle body 3 has changed, and maintains the attitude stability of the vehicle body 3. In other words, because the attitude stabilizing system 4 is provided, when the vehicle chassis 2 moves, the attitude of the vehicle body 3 is kept stable, and the vehicle body 3 is dynamically stabilized.

In addition, because there are a plurality of ground contact locations between the plurality of provided wheels 23 and the travel path, the contact surface area between the wheels 23 and the travel path is increased, and adequate grip can be obtained by the wheels 23 when the wheels 23 are moving. Because an adequate grip can be obtained, even if dust or liquid on the travel path does become adhered to the wheel 23 surface, slipping of the wheels 23 on the travel path is reduced.

Furthermore, because the plurality of wheels 23 are in ground contact with the travel path, compared with when a single sphere is in ground contact with the travel path, vibrations from bumps or rough ground that are transmitted to the vehicle chassis 2 and vehicle body 3 when moving are reduced.

Accordingly, in the omnidirectional moving device 1 according to the present exemplary embodiment, it is possible to dynamically stabilize the vehicle body 3 that is statically unstable, and to improve propulsive force, and to also improve quietness.

Moreover, in the omnidirectional moving device 1 according to the present exemplary embodiment, as is shown in FIG. 2 and FIG. 3, because the number of kinematic pairs of the universal coupling 5 is two, the vehicle body 3 has degrees of freedom in two directions relative to the vehicle chassis 2, and the attitude of the vehicle body 3 can be changed in these two directions.

For example, the two degrees of freedom are set such that a Y axial direction (i.e., the first axial direction y) of a three-dimensional coordinate system is taken for the first rotation shafts 51 and one degree of freedom pivots around these first rotation shafts 51, and an X axial direction (i.e., the second axial direction x) is taken for the second rotation shafts 52 and one degree of freedom pivots around these second rotation shafts 52. The attitude of the vehicle body 3 can be changed within the range of these two degrees of freedom. Here, a degree of freedom that pivots around a third rotation shaft that extends in a Z axial direction is not set. Because of this, when the vehicle chassis 2 is turned, the vehicle body 3 can be turned so as to track the turning of the vehicle chassis 2. In other words, it is possible to eliminate idle rotation of the vehicle body 3.

Furthermore, in the omnidirectional moving device 1 according to the present exemplary embodiment, as is shown in FIG. 3 in particular, the universal coupling 5 is provided with the first rotation shafts 51, the second rotation shafts 52, and the coupling portion 55. The first rotation shafts 51 are supported in an upper portion of the vehicle chassis 2, and take one direction of movement of the vehicle chassis 2 as the first axial direction y thereof. The second rotation shafts 52 are supported in a lower portion of the vehicle body 3, and another direction of movement of the vehicle chassis 2, which direction also intersects the first axial direction y, is taken as a second axial direction x thereof. The coupling portion 55 is capable of rotating around the first axial direction y, and is also capable of rotating around the second axial direction x.

As a consequence, because the coupling portion 55 is capable of rotating around two rotation shafts, namely, around the first axial direction y and the second axial direction x, a universal coupling 5 having two kinematic pairs can be easily achieved.

Moreover, in the omnidirectional moving device 1 according to the present exemplary embodiment, as is shown in FIG. 6 in particular, the attitude stabilizing system 4 is provided with the drive units 22. The drive units 22 are formed so as to include the motor 26, the reduction gear 24 (see, or example, FIG. 4), and the servo amp 28. As is shown in FIG. 4, the motor 26 is provided in the vehicle chassis 2. As is shown in FIG. 4, the reduction gear 24 is provided in the vehicle chassis 2, and increases driving torque from the motor 26, then transmits this driving torque to the wheels 23. As is shown in FIG. 1 and FIG. 2, the servo amp 28 is provided in the vehicle body 3 and, as is shown in FIG. 6, is connected to the motor 26 so as to drive the motor 26.

Because the drive units 22 that are formed so as to include these portions are provided, in the attitude stabilizing system 4, the attitude of the vehicle body 3 can be kept stable when the vehicle chassis 2 is moving, and the vehicle body 3 can be dynamically stabilized.

Furthermore, in the omnidirectional moving device 1 according to the present exemplary embodiment, as is shown in FIG. 4D, the wheels 23 are formed by the first Omni wheel 231 and the second Omni wheel 232. As is shown in FIG. 4C and FIG. 4D, the first Omni wheel 231 is formed by providing the plurality of rollers 231B on the circumference of the driving wheel 231A, such that the rollers 231B rotate freely with the direction of the rotation axis b thereof extending in the circumferential direction of the driving wheel 231A. In the same way, the second Omni wheel 232 is formed by providing the plurality of rollers 232B on the circumference of the driving wheel 232A, such that the rollers 232B rotate freely with the direction of the rotation axis b thereof extending in the circumferential direction of the driving wheel 232A.

As a consequence, because it is possible, using the wheels 23, to cause the vehicle chassis 2 to move in a movement direction made possible by the rotation of the rollers 231B and the rollers 232B, in addition to a movement direction made possible by the rotation of the driving wheel 231A and the driving wheel 232A, it is possible to obtain an omnidirectional moving device 1 that is capable of moving in all directions on a plane.

Additionally, in the omnidirectional moving device 1 according to the present exemplary embodiment, as is shown in FIG. 6, the attitude stabilizing system 4 is provided with the control unit 40 having the pulse counter 45, the attitude angle detection portion 42, and the computation unit 43. The pulse counter 45 of the control unit 40 acquires a rotation angle of the motor 26. The attitude angle detection portion 42 acquires an attitude angle of the vehicle body 3 and an angular velocity of the vehicle body 3. The computation unit 43 calculates the operating state for the vehicle body 3 that maintains the attitude stability of the vehicle body 3 based on the acquired rotation angle, attitude angle, and angular velocity. Furthermore, in the computation unit 43, the servo amp 28 is controlled based on the result of the calculation.

Because of this, in the attitude stabilizing system 4, the attitude of the vehicle body 3 can be kept stable when the vehicle chassis 2 moves, and the vehicle body 3 can be dynamically stabilized.

Furthermore, in the omnidirectional moving device 1 according to the present exemplary embodiment, as is shown in FIG. 3 and FIG. 4 in particular, the damping device 27 is provided. The damping device 27 is provided between the wheels 23 and the vehicle chassis 2. Because of this, vibration that is generated in the wheels 23 due to the state of the road surface of a travel path while moving on that travel path is reduced by the damping device 27, and the vibration transmitted from the wheels 23 to the vehicle chassis 2 and the vehicle body 3 can be reduced.

Moreover, in the omnidirectional moving device 1 according to the present exemplary embodiment, as is shown in FIG. 5A and FIG. 5B in particular, the locking device 7 is fitted onto the first rotation shafts 51 and the second rotation shafts 52. This locking device 7 enables the attitude of the vehicle body 3 to be changed when the vehicle chassis 2 is moving, and locks the attitude of the vehicle body 3 when the vehicle chassis 2 has stopped. Additionally, the locking device 7 also enables the attitude of the vehicle body 3 to be locked when the vehicle chassis 2 is not moving.

As a consequence, because the attitude of the vehicle body 3 can be kept stable even when movement of the vehicle chassis 2 is stopped, it is possible to improve the safety of a passenger when they are getting on or off the omnidirectional moving device 1, or during an emergency.

Furthermore, the attitude control method for the omnidirectional moving device 1 according to the present exemplary embodiment firstly utilizes the attitude stabilizing system 4 of the omnidirectional moving device 1, and causes the following steps, which are shown in FIG. 9, to be executed by the attitude stabilizing system. Namely, the rotation angle of the motor 26 is acquired (S2), and the attitude angle of the vehicle body 3 and the angular velocity of the vehicle body 3 are acquired (S1). Next, based on the acquired rotation angle, attitude angle, and angular velocity, an operating state for the vehicle body 3 is calculated by the attitude stabilizing system 4 (see FIG. 6) so as to keep the attitude stable. Based on the result of this calculation, the attitude stabilizing system 4 controls the servo amp 28 so as to cause the vehicle chassis 2 to move in a state that maintains the attitude stability of the vehicle body 3. Because of this, using this attitude control method, it is possible to move the vehicle chassis 2 while dynamically stabilizing the vehicle body 3 of the omnidirectional moving device 1.

Second Exemplary Embodiment

Hereinafter, an omnidirectional moving device and an attitude control method for the same according to a second exemplary embodiment in the invention will be described using FIG. 10 through FIG. 14.

Note that, in the present exemplary embodiment, component elements that are the same or essentially the same as component elements of the omnidirectional moving device and control method for the same according to the first exemplary embodiment are given the same descriptive symbols, and to avoid redundancy, any description of such component elements is omitted.

[Structure of an Omnidirectional Moving Device]

As is shown in FIG. 10 and FIG. 11A through FIG. 11C, an omnidirectional moving device 1 according to the present exemplary embodiment is provided with a vehicle chassis 6 that is capable of moving omnidirectionally, a vehicle body 3 that is mounted onto the vehicle chassis 6, and an attitude stabilizing system 4 that moves the vehicle chassis 6 and also maintains the stability of the attitude of the vehicle body 3. Furthermore, the omnidirectional moving device 1 is formed so as to include a universal coupling 5 that connects the vehicle chassis 6 to the vehicle body 3.

(1) Structure of the Vehicle Chassis 6

As is shown in FIG. 10 and FIG. 11A through FIG. 11C, and particularly in FIG. 12A through FIG. 12D, the vehicle chassis 6 is provided with a vehicle main chassis 61. This vehicle main chassis 61 is formed so as to include a top plate portion 611, and a side plate portion 612 and a side plate portion 613 that together form a left and right pair.

The top plate portion 611 is formed using a plate material whose thickness direction extends in the vehicle up-down direction, and, when looked at in a top view, is formed in a rectangular shape whose longitudinal direction extends in the vehicle width direction. Here, although not shown in the drawings, a bottom plate portion is provided at a position facing the top plate portion 611 and separated on the vehicle lower side from the top plate portion 611. This bottom plate portion is formed having the same shape as the top plate portion 611.

The side plate portion 612 is disposed at a right end portion in the vehicle width direction of the top plate portion 611 when looked at from the vehicle front side, and an upper end portion of the side plate portion 612 is connected to this right end portion. The side plate portion 612 is formed in a plate shape whose thickness direction extends in the vehicle width direction and, when looked at in a side view, is formed in a rectangular shape whose longitudinal direction extends in the vehicle front-rear direction.

In contrast, the side plate portion 613 is disposed at a left end portion in the vehicle width direction of the top plate portion 611 when looked at from the vehicle front side, and an upper end portion of the side plate portion 613 is connected to this left end portion. The side plate portion 613 is formed in a plate shape and in a rectangular shape in the same way as the side plate portion 612.

A lower end portion of the side plate portion 612 is connected to a right end portion of the bottom plate portion (not shown in the drawings), and a lower end portion of the side plate portion 613 is connected to a left end portion of the bottom plate portion. Accordingly, the vehicle main chassis 61 is formed as a hollow rectangular frame body when looked at from the vehicle front side. In addition, in the same way as the vehicle main chassis 21 of the omnidirectional moving device 1 of the first exemplary embodiment, the vehicle main chassis 61 is formed from a metal material or a resin material.

Drive units 62 that form the attitude stabilizing system 4 are disposed in the vehicle main chassis 61. More specifically, when looked at from the vehicle front side, one drive unit 62A of the drive units 62 is disposed at a left side in the vehicle width direction of the vehicle main chassis 61 and at the vehicle front side thereof. In addition, a drive unit 62B is disposed at a left side in the vehicle width direction of the vehicle main chassis 61 and at the vehicle rear side thereof. In the same way, a drive unit 62C is disposed at a right side in the vehicle width direction of the vehicle main chassis 61 and at the vehicle front side thereof, and a drive unit 62D is disposed at a right side in the vehicle width direction of the vehicle main chassis 61 and at the vehicle rear side thereof.

In other words, a total of four drive units 62, namely, the drive unit 62A through the drive unit 62D are provided. In the same way as the drive units 22 of the omnidirectional moving device 1 according to the first exemplary embodiment, structure in which two or more of the drive units 62 are provided is generally taken as a basic structure, however, in the present exemplary embodiment, three or more drive units 62 are provided so that static stability of the vehicle chassis 6 on a travel path is ensured.

Figure 10:
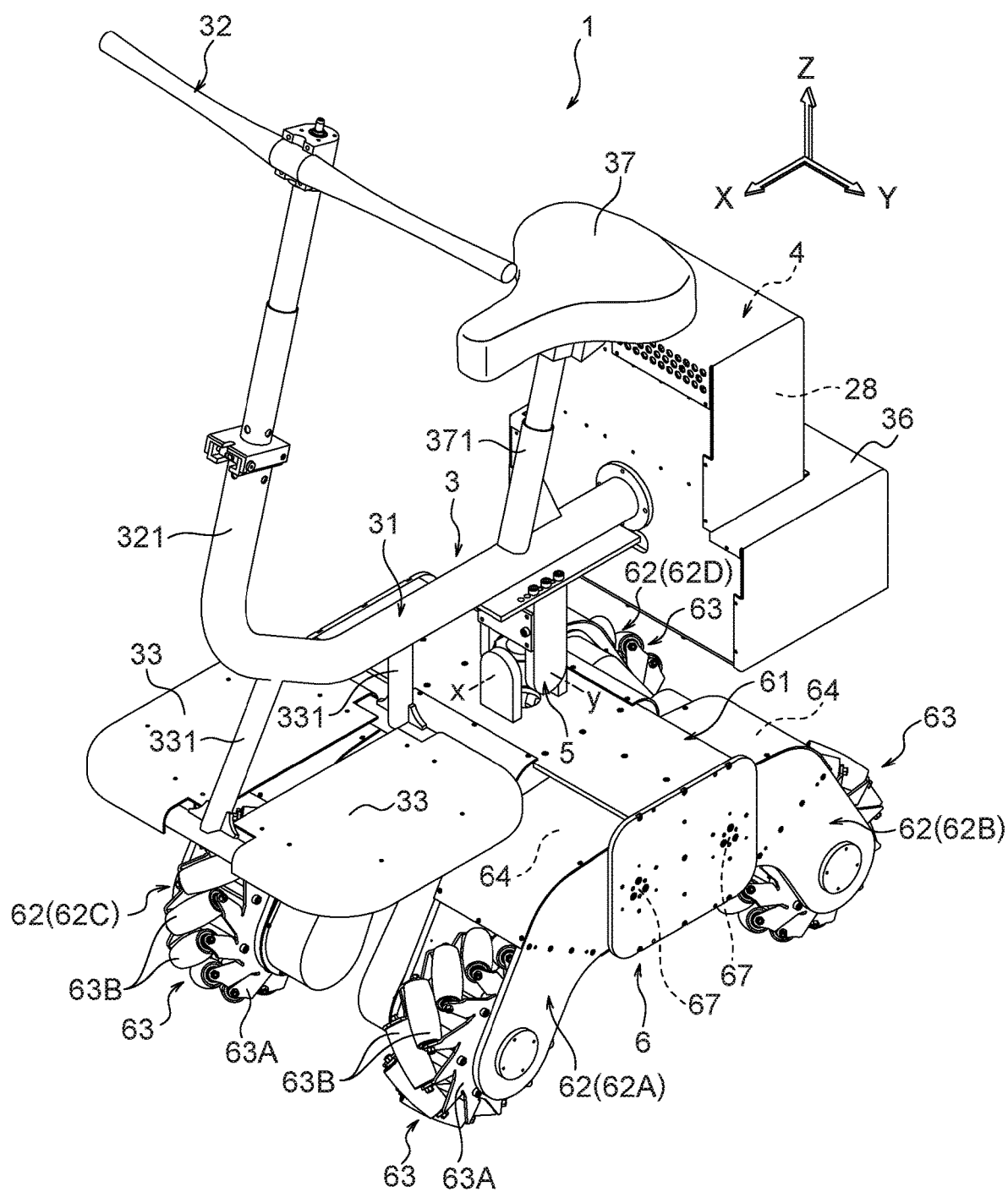
FIG. 10 is an external perspective view as seen from an upward direction on a left-front side showing an omnidirectional moving device according to a second exemplary embodiment in the invention.
Figure 11A:
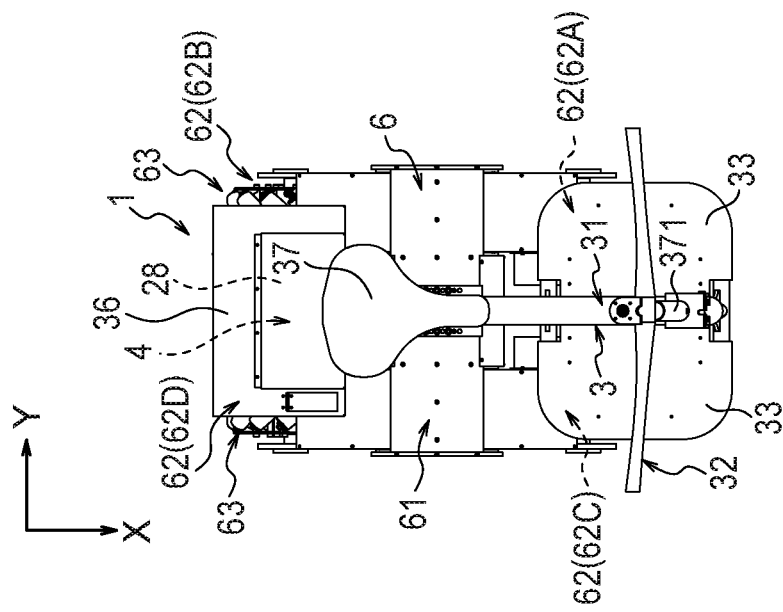
FIG. 11A is a top view as seen from above showing the omnidirectional moving device shown in FIG. 10.
Figure 11B:
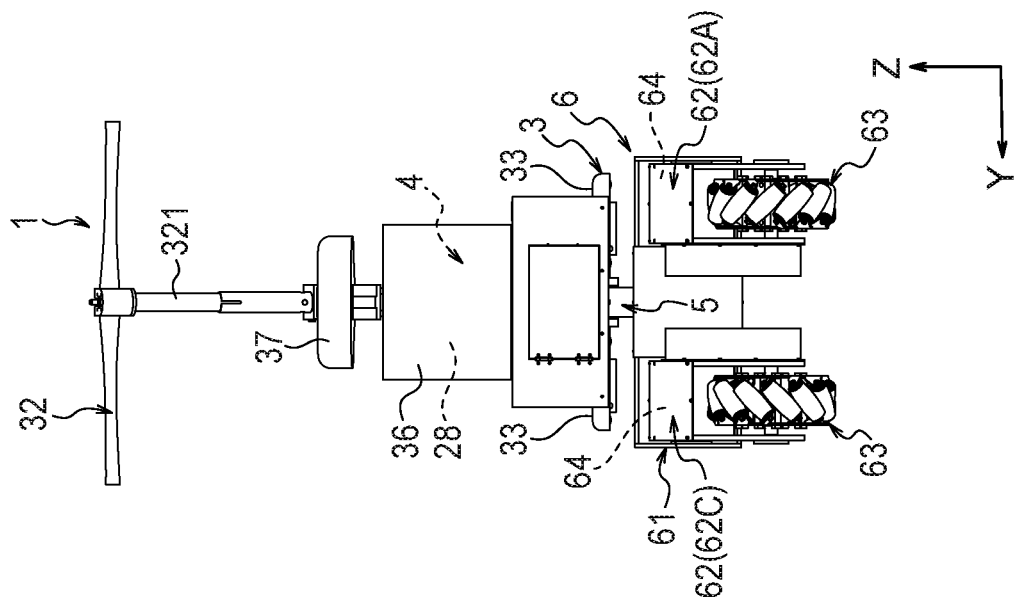
FIG. 11B is a rear view as seen from the rear showing the same omnidirectional moving device.
Figure 11C:
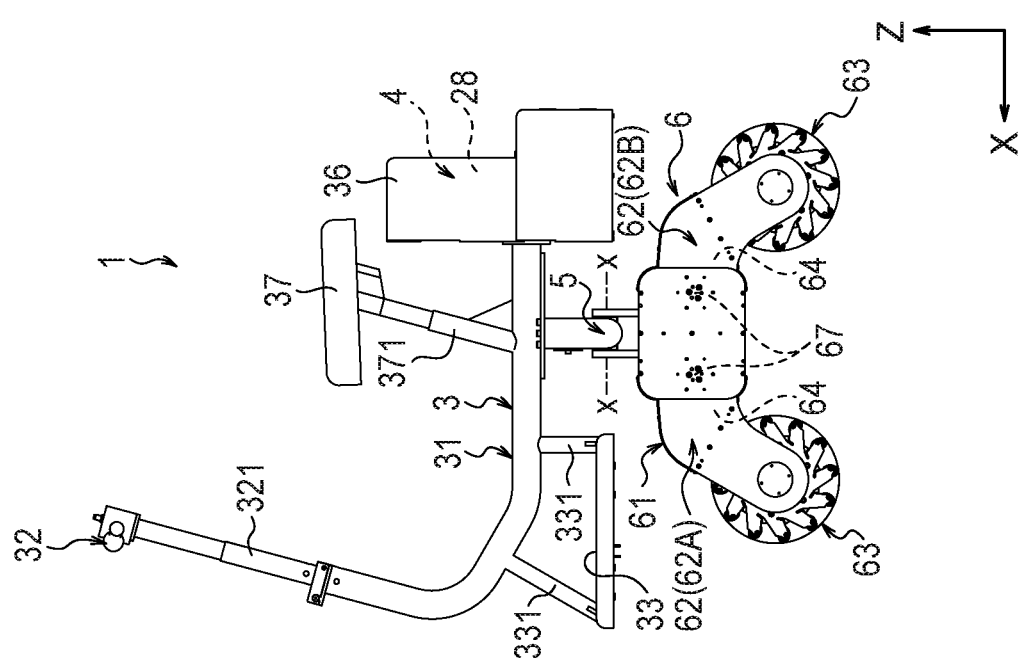
FIG. 11C is a side view as seen from a side showing the same omnidirectional moving device.

As is shown particularly in FIG. 13A through FIG. 13D, the drive unit 62A of the drive units 62 is provided with a drive unit casing 621, and is formed so as to include the motor 26, a reduction gear 64, and the servo amp 28 which is shown in FIG. 10 and FIG. 11.

The drive unit casing 621 is formed in a frontless box shape in which a front surface is left open having a bottom wall 621A, a top wall 621B, and a side wall 621C and a side wall 621D that are disposed as a pair on the left and right sides. The bottom wall 621A protrudes towards the vehicle front side from the vehicle main chassis 62, and is formed in a rectangular plate shape whose plate thickness direction extends in the vehicle up-down direction. The top wall 621B is disposed on the vehicle upper side of the bottom wall 621A so as to face towards the bottom wall 621A. A vehicle front end portion of the top wall 621B protrudes towards the vehicle front side beyond the bottom wall 621A, and is formed in an arc shape that curves down towards the vehicle lower side.

The side wall 621C is disposed so as to extend between an end portion on the outer side in the vehicle width direction of the bottom wall 621A and an end portion on the outer side in the vehicle width direction of the top wall 621B, and is formed in a plate shape whose thickness direction extends in the vehicle width direction. A vehicle front end portion of the 621C is curved towards the vehicle body lower side from a horizontal direction so that, when looked at in a side view, the side wall 621C is formed in an inverted V shape or in an inverted L shape. The side wall 621D is disposed so as to face the side wall 621C between an end portion on the inner side in the vehicle width direction of the bottom wall 621A and an end portion on the inner side in the vehicle width direction of the top wall 621B, and is formed in a plate shape in the same way as the side wall 621C. The vehicle front end portions of the side wall 621C and the side wall 621D support wheels 63 such that the wheels 63 are able to rotate.

The motor 26 is the same type of electric motor as the electric motor of the omnidirectional moving device 1 according to the first exemplary embodiment, and is mounted on the side wall 621D of the drive unit casing 621. A drive rotation shaft (not shown in the drawings) of this motor 26 is connected to one end (not shown in the drawings) of an output shaft 641 of the reduction gear 64 (not shown in the drawings) which is disposed inside the drive unit casing 621. Another end of the output shaft 641 is supported on the end portion on the vehicle front side of the side wall 621C of the drive unit casing 621 so as to be able to rotate freely around a rotation axis c (see FIG. 13A, FIG. 13B, and FIG. 13D).

Wheels 63 that enable the vehicle chassis 6 to be moved omnidirectionally are provided on the output shaft 641. In the present exemplary embodiment, instead of the wheels 23 of the omnidirectional moving device 1 according to the first exemplary embodiment, namely, the first Omni wheels 231 and the second Omni wheels 232, as is shown in FIG. 13, in particular, Mecanum wheels are used for the wheels 63.

As is shown in FIG. 13A through FIG. 13D, in particular, the Mecanum wheels are formed by providing a plurality of barrel-shaped rollers 63B on a circumference of a gear-shaped shaped driving wheel 63A, which is fixed to the output shaft 641, such that these rollers 63B rotate freely with a rotation axis d thereof extending in a tilted direction relative to the rotation axis c of the driving wheel 63A. At the skew position, the rotation axis d is set at a tilt angle α relative to the rotation axis c of, for example, 135 degrees as an absolute value (see FIG. 14B). In this case, 12 rollers 63B are arranged at equidistant placement pitches on the circumference of the driving wheel 63A.

Figure 12A:
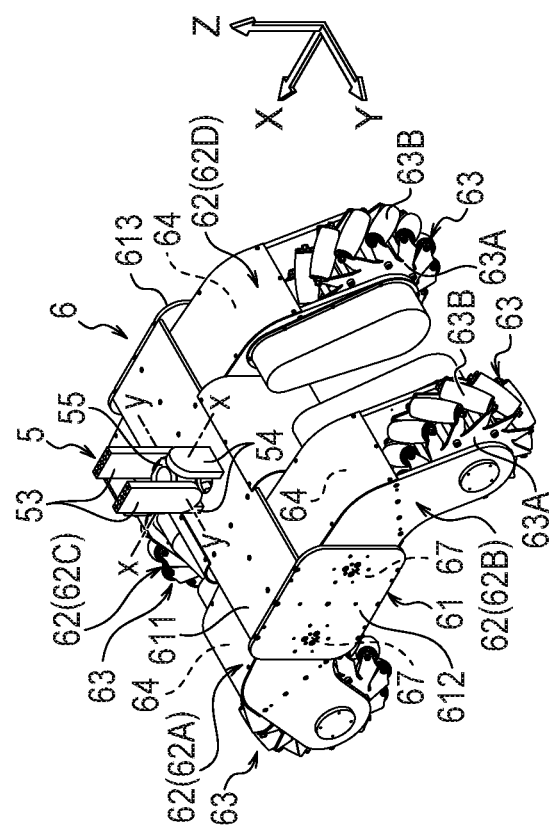
FIG. 12A is an external perspective view as seen from an upward direction on a left-rear side showing a vehicle chassis of the omnidirectional moving device shown in FIG. 10.
Figure 12B:
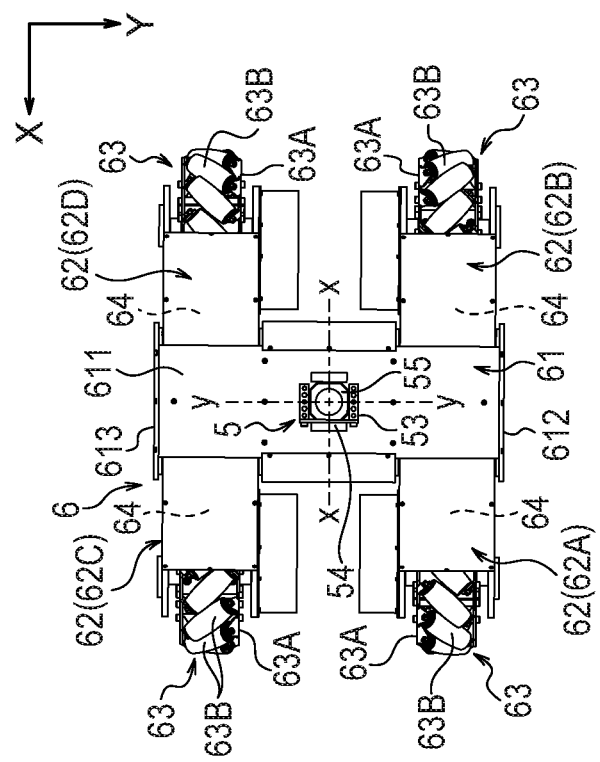
FIG. 12B is a top view as seen from above showing the vehicle chassis.
Figure 12C:
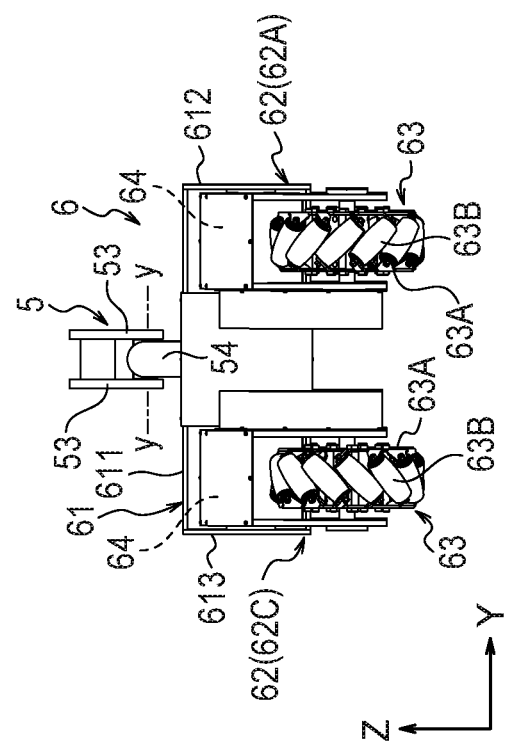
FIG. 12C is a front view as seen from the front showing the vehicle chassis.
Figure 12D:
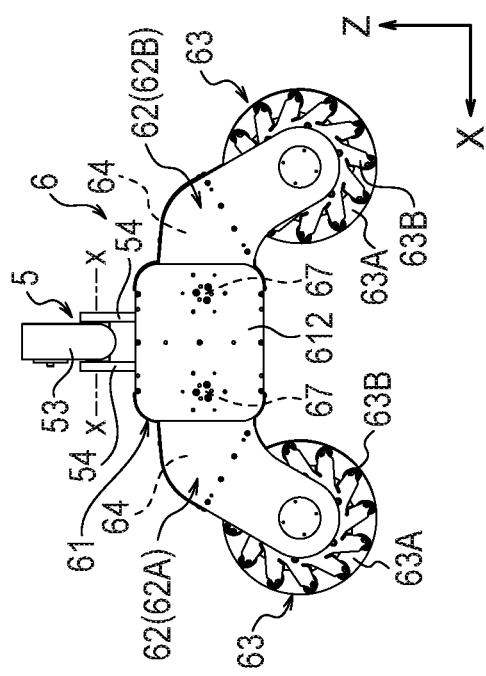
FIG. 12D is a side view as seen from a side showing the vehicle chassis.

As is shown FIG. 12A and FIG. 12D, and in FIG. 13A through FIG. 13D, the drive unit 62A is provided in the vehicle main chassis 61 via a damping device 67. More specifically, the damping device 67 is disposed in an inner portion on a vehicle rear side of the drive unit casing 621, and is fitted to the vehicle front end portion of the side plate portion 612 of the vehicle main chassis 61. In the same way as the damping device 27 of the omnidirectional moving device 1 according to the first exemplary embodiment, the damping device 67 dampens vibrations transmitted from the travel path to the wheels 63 via the vehicle chassis 6 so that these vibrations are reduced.

The drive unit 62B of the drive unit 62 which is shown in FIG. 12A through FIG. 12D is formed having left-right symmetry with the drive unit 62A centered on the Y axis, and a basic structure thereof is the same as the basic structure of the drive unit 62A. The drive unit 62C is formed having left-right symmetry with the drive unit 62A centered on the X axis, and a basic structure thereof is the same as the basic structure of the drive unit 62A. Additionally, the drive unit 62D is formed having left-right symmetry with the drive unit 62C centered on the Y axis, and is also formed having left-right symmetry with the drive unit 62B centered on the X axis, and a basic structure thereof is the same as the basic structure of the drive unit 62A.

(2) Structure of the Vehicle Body 3

Returning to FIG. 10 and FIG. 11A through FIG. 11C, the vehicle body 3 is formed so as to include the vehicle main body 31, the handlebar 32, the foot placement portions 33, and a saddle 37. The vehicle main body 31 is disposed on the vehicle chassis 2. In the present exemplary embodiment, the vehicle main body 31 is formed such that a hollow tube shaped component whose axial direction extends in the vehicle front-rear direction forms a main body thereof.

A handle support 321 that stands upright is formed integrally with a vehicle front end portion of the vehicle main body 31, and the handlebar 32 is mounted on an upper end portion of the handle support 321. The handlebar 32 is formed in a rod shape that protrudes towards both the left and right outer sides in the vehicle width direction, and a passenger causes the omnidirectional moving device 1 to travel while gripping the handlebar 32. In the present embodiment as well, the handlebar 32 is a fixed type of handle which is unable to turn around a vertical axis (i.e., around a Z axis).

The starting switch, brakes, and safety features and the like can be mounted on the handlebar 32 in the same way as in the omnidirectional moving device 1 according to the first exemplary embodiment.

The foot placement portions 33 are supported on a pair of front and rear supports 331 that extend downwards from the vehicle main body 31 at the vehicle front end portion of the vehicle main body 31. The foot placement portions 33 are provided as a pair on the left and right outer sides in the vehicle width direction. The foot placement portions 33 are provided with flat portions that extend in the vehicle front-rear direction and in the vehicle width direction, and are used as portions where a passenger is able to place his/her left foot and right foot.

A saddle 37 is mounted, via a saddle support 371 that stands upright in the direction of the vehicle body upper side, in a central portion in the vehicle front-rear direction of the vehicle main body 31. A passenger is able to sit on the saddle 37 and, when the passenger is seated on the saddle 37, they are able to cause the omnidirectional moving device 1 to travel.

A box-shaped vehicle body cover 36 is attached to the vehicle rear end portion of the vehicle main body 31. The previously-described attitude stabilizing system 4 shown in FIG. 6 is housed inside the vehicle body cover 36. Additionally, the servo amp 28 that forms part of the drive units 62, and a power supply 46 and the like are housed inside the vehicle body cover 36.

(3) Structure of the Universal Coupling 5

In the same way as the universal coupling 5 of the omnidirectional moving device 1 according to the first exemplary embodiment, as is shown in FIG. 10, FIG. 11B, FIG. 11C, and FIG. 12A through FIG. 12D, the universal coupling 5 that connects together the vehicle chassis 6 and the vehicle body 3 is provided. As is shown in detail in FIG. 5A and FIG. 5B, the universal coupling 5 is formed so as to include the first rotation shafts 51, the second rotation shafts 52, and the spider 55.

The first rotation shafts 51 are formed such that the vehicle width direction forms the first axial direction y thereof, and a pair of the first rotation shafts 51 are provided at a distance from each other in the first axial direction y in a lower portion in the center in the vehicle front-rear direction of the vehicle main body 31. This pair of first rotation shafts 51 are supported in the central portion in the vehicle front-rear direction of the vehicle main body 31 via the pair of first supporting portions 53 that are provided apart from each other in the first axial direction y.

The second rotation shafts 52 are formed such the vehicle front-rear direction forms the second axial direction x thereof, and, in this case, a pair of the second rotation shafts 52 are provided at a distance from each other in the second axial direction x in a central portion in the vehicle chassis front-rear direction and a central portion in the vehicle chassis width direction of the top plate portion 611 of the vehicle chassis 6. In the present exemplary embodiment, the second axial direction x is set on the same horizontal plane as the first axial direction y. This pair of second rotation shafts 52 are supported in a central portion in the vehicle chassis front-rear direction of the top plate portion 611 via the pair of second supporting portions 54 that are provided apart from each other in the second axial direction x.

The structure of the spider 55, the structure of the first rotation shafts 51, the structure of the first supporting portions 53, the structure of the second rotation shafts 52, and the structure of the second supporting portions 54 are each the same as the structures of the corresponding portion of the universal coupling 5 of the omnidirectional moving device according to the first exemplary embodiment.

As a result, the universal coupling 5 enables the vehicle body 3 to rotate relative to the vehicle chassis 6 around the first rotation shafts 51, and also enables the vehicle body 3 to rotate relative to the vehicle chassis 6 around the second rotation shafts 52. In other words, the number of kinematic pairs of the universal coupling 5 is set to two.

(4) Structure of the Locking Device 7

Although not shown in FIG. 10 through FIG. 12, the locking device 7 is formed having the same structure as the previously described locking device 7 of the omnidirectional moving device 1 according to the first exemplary embodiment which is shown in FIG. 5A and FIG. 5B. In other words, the locking device 7 is formed so as to include the first locking devices 71 that are fitted onto the first rotation shafts 51 of the universal coupling 5, the second locking devices 72 that are fitted onto the second rotation shafts 52 thereof, and the lock operating unit 73 that operates the first locking devices 71 and the second locking devices 72. In order to avoid redundancy, a detailed description of these component elements is omitted.

(5) Structure of the Attitude Stabilizing System

The attitude stabilizing system 4 is formed so as to include the drive units 62 shown in FIG. 10 through FIG. 13, and the control unit 40 shown in the previously described in FIG. 6. The control unit 40 is formed so as to include the pulse counter 45, the attitude angle detection portion 42, the computation unit 43, and the analog converter 44, and the like, and has the same structure as the control unit 40 of the omnidirectional moving device 1 according to the first exemplary embodiment. Because of this, a detailed description of the attitude stabilizing system 4 is omitted.

[Attitude Control Method for an Omnidirectional Moving Device]

An attitude control method for the omnidirectional moving device 1 is fundamentally similar to the attitude control method for the omnidirectional moving device 1 according to the first exemplary embodiment. Here, FIG. 14A is a schematic perspective view showing a model of the omnidirectional moving device 1 according to the second exemplary embodiment in a three-dimensional coordinate system, and FIG. 14B is a schematic top view showing a model of the vehicle chassis 6 and wheels (i.e., Mecanum wheels) 63 of the omnidirectional moving device 1. Note that FIG. 10 through FIG. 13 will be used where appropriate in order to describe this attitude control method, as well as the above-described FIG. 6, FIG. 8, and FIG. 9.

(1) Kinematics of the Vehicle Chassis 6 of the Omnidirectional Moving Device 1

Firstly, kinematics of the vehicle chassis 6 and the vehicle body 3 of the omnidirectional moving device 1 shown in FIG. 10 through FIG. 13 will be described using FIG. 14A. Here, the three-dimensional coordinates are shown by $X_0$ for the X axis, $Y_0$ for the Y axis, and $Z_0$ for the Z axis.

In the omnidirectional moving device 1, the axis in the vehicle front-rear direction of the vehicle chassis 6 is defined as the $X_c$ axis, the axis in the vehicle width direction of the vehicle chassis 6 is defined as the $Y_c$ axis, and the axis in the up-down direction of the vehicle chassis 6 passing through the center of the universal coupling 5 is defined as the $Z_c$ axis.

A velocity vector $v_c$ of the position of the universal coupling 5 that is attached to the vehicle chassis 6 is shown by the above Formula (1) that was described in the attitude control method for the omnidirectional moving device 1 according to the first exemplary embodiment.

An angular velocity vector $\omega_c$ of the vehicle chassis 6 is shown by the above Formula (2).

A position vector $p_k$ of a center of a k-th wheel 63 taking a center 6C of the vehicle chassis 6 as a start point is shown by the above Formula (3). Here, in the present exemplary embodiment, because the four drive units 62A through 62D are provided, and the four wheels 63 are provided, k is 1, ..., 4.

An angular velocity vector of the k-th wheel 63 is taken as $\omega_k$, and the angular velocity vector $\omega_k$ is taken as the size ($|\omega_k|$) of the angular velocity vector $\omega_k$.

If the angular velocity vector $\omega_k$ is taken as a unit vector having the same orientation as that described in the following Formula (55), then the angular velocity vector $\omega_k$ is shown by the following Formula (56).

[Formula 55]

$$e_k = [e_{kx}, e_{ky}, 0]^T \quad (55)$$

[Formula 56]

$$\omega_k = \omega_k e_k \quad (56)$$

A position vector of a ground contact point of the wheel 63 that takes the center of the wheel 63 as a start point is shown by the above Formula (4). $r_w$ is the radius of the wheel 63.

A unit vector (i.e., a Mecanum wheel tangent vector) $t_k$ that is parallel to the rotation axis of the roller 63B taking the ground contact point of the k-th wheel 63 as a start point is shown by the above Formula (5).

Using the above definitions, a velocity $v_k$ of the ground contact point of the k-th wheel 63 is shown by the above Formula (6).

Assuming that the roller 63B of the k-th wheel 63 is in ground contact with the ground contact point, and the roller 63B is not sliding in the axial direction thereof, then the relationship shown by the above Formula (7) is established between the velocity $v_k$ and the unit vector $t_k$.

If Formula (6) is substituted into Formula (7), and if the fact that the velocity $v_k$, the position vector $p_k$, the angular velocity vector $\omega_k$ and the unit vector $t_k$ are orthogonal to the Z axis $Z_0$, and the fact that the angular velocity vector $\omega_c$ and radius $r_w$ are parallel with the Z axis $Z_0$ are considered, then the following Formula (57) is obtained.

[Formula 57]

$$t_{kx}v_x + t_{ky}v_y + (p_{kx}t_{ky} - p_{ky}t_{kx})\omega_z = -r_w\omega_k(e_{kx}t_{ky} - e_{ky}t_{kx}) \quad (57)$$

If the above Formula 57 is grouped together, then the following Formula (58) is obtained.

[Formula 58]

$$\begin{bmatrix} t_{1x} & t_{1y} & p_{1x}t_{1y}-p_{1y}t_{1x} \\ t_{2x} & t_{2y} & p_{2x}t_{2y}-p_{2y}t_{2x} \\ t_{3x} & t_{3y} & p_{3x}t_{3y}-p_{3y}t_{3x} \\ t_{4x} & t_{4y} & p_{4x}t_{4y}-p_{4y}t_{4x} \end{bmatrix} \begin{bmatrix} v_x \\ v_y \\ \omega_z \end{bmatrix} = \quad (58)$$

$$-r_w \begin{bmatrix} e_{1x}t_{1y}-e_{1y}t_{1x} & 0 & 0 & 0 \\ 0 & e_{2x}t_{2y}-e_{2y}t_{2x} & 0 & 0 \\ 0 & 0 & e_{3x}t_{3y}-e_{3y}t_{3x} & 0 \\ 0 & 0 & 0 & e_{4x}t_{4y}-e_{4y}t_{4x} \end{bmatrix} \begin{bmatrix} \omega_1 \\ \omega_2 \\ \omega_3 \\ \omega_4 \end{bmatrix}$$

The generalized velocity vector of the vehicle chassis 6 is defined by the above Formula (11), the vector $\omega_w$ obtained by combining the angular velocities of the wheels 63 is defined by the above Formula (12), and the velocity transfer matrix T is defined using the following Formula (59).

[Formula 59]

Velocity transfer matrix $$T := -\frac{1}{r_w} \begin{bmatrix} e_{1x}t_{1y}-e_{1y}t_{1x} & 0 & 0 & 0 \\ 0 & e_{2x}t_{2y}-e_{2y}t_{2x} & 0 & 0 \\ 0 & 0 & e_{3x}t_{3y}-e_{3y}t_{3x} & 0 \\ 0 & 0 & 0 & e_{4x}t_{4y}-e_{4y}t_{4x} \end{bmatrix}^{-1} \times \begin{bmatrix} t_{1x} & t_{1y} & p_{1x}t_{1y}-p_{1y}t_{1x} \\ t_{2x} & t_{2y} & p_{2x}t_{2y}-p_{2y}t_{2x} \\ t_{3x} & t_{3y} & p_{3x}t_{3y}-p_{3y}t_{3x} \\ t_{4x} & t_{4y} & p_{4x}t_{4y}-p_{4y}t_{4x} \end{bmatrix} \quad (59)$$

Using the above definitions, a relationship between the angular velocities $\omega_w$ of the wheels 63 and the generalized velocity vector of the vehicle chassis 6 can be expressed by the above Formula 14. Here, in the above Formula (59), the symbol $[\ ]^{-1}$ shows an inverse matrix.

The above Formula (14) is an overdetermined system of the generalized velocity vector, and a least squares solution of the generalized velocity vector is provided by the above Formula (15) using a generalized inverse of the velocity transfer matrix T.

If the placement of the wheels 63 is appropriate, then an inverse matrix of $T^T T$ exists.

Based on the principle of virtual work, the vector $\tau_w$ obtained by combining the torques of the wheels 63, and the generalized force vector of the vehicle chassis 6 shown by the above Formula (16) satisfy the relationship shown in the above Formula (17).

Here, in the above Formula (16), the unit vector $f_x$ is the propulsive force in the $X_c$ axial direction of the vehicle chassis 6, $f_y$ is the propulsive force in the $Y_c$ axial direction of the vehicle chassis 6, and $\tau_z$ is the turning torque around the $Z_c$ axis of the vehicle chassis 6.

The above Formula (17) is an underdetermined system of the vector $\tau_w$, and a minimum norm solution of the vector $\tau_w$ is provided by the above Formula (18) using a generalized inverse of T.

For example, as is shown in FIG. 14B, if the wheelbase of the vehicle chassis 6 of the omnidirectional moving device 1 is taken as lw, and the axle track is taken as lt, then the values of the respective matrix components in the above Formula (59) become the values shown in the following Formula (60) through Formula (62).

[Formula 60]

$$e_{1x}=e_{2x}=e_{3x}=e_{4x}=0,\quad e_{1y}=e_{2y}=1,\quad e_{3y}=e_{4y}=-1 \quad (60)$$

[Formula 61]

$$t_{1x}=t_{4x}=\frac{1}{\sqrt{2}},\quad t_{2x}=t_{3x}=-\frac{1}{\sqrt{2}},\quad t_{1y}=t_{2y}=-\frac{1}{\sqrt{2}}, \quad (61)$$

$$t_{3y}=t_{4y}=\frac{1}{\sqrt{2}}$$

[Formula 62]

$$p_{1x}=p_{4x}=\frac{l_w}{2},\quad p_{2x}=p_{3x}=-\frac{l_w}{2},\quad p_{1y}=p_{2y}=\frac{l_t}{2}, \quad (62)$$

$$p_{3y}=p_{4y}=-\frac{l_t}{2}$$

If these values are substituted in the above Formula (59), then as is shown in the following Formula (63), the velocity transfer matrix T can be calculated.

[Formula 63]

$$T=\frac{1}{r_w}\begin{bmatrix} 1 & -1 & -\frac{l_w+l_t}{2} \\ 1 & 1 & -\frac{l_w+l_t}{2} \\ -1 & 1 & -\frac{l_w+l_t}{2} \\ -1 & -1 & -\frac{l_w+l_t}{2} \end{bmatrix} \quad (63)$$

(2) Kinematics of the Vehicle Body 3 of the Omnidirectional Moving Device 1

The description of the kinematics of the vehicle body 3 of the omnidirectional moving device 1 according to the present exemplary embodiment is the same as the description of the kinematics of the vehicle body 3 of the omnidirectional moving device 1 according to the first exemplary embodiment. However, the 'vehicle chassis 2' of the first exemplary embodiment has been replaced by 'vehicle chassis 6' in the present exemplary embodiment.

(3) Dynamics of the Omnidirectional Moving Device 1

The description of the dynamics of the omnidirectional moving device 1 according to the present exemplary embodiment includes descriptions of each of '1. Derivation of an Equation of Motion' and '2. Linear Approximation Model', and is the same as the description of the dynamics of the vehicle body 3 of the omnidirectional moving device 1 according to the first exemplary embodiment. However, the 'vehicle chassis 2' of the first exemplary embodiment has been replaced by 'vehicle chassis 6' in the present exemplary embodiment.

(4) Control Method for the Omnidirectional Moving Device 1

The description of the control method for the omnidirectional moving device 1 according to the present exemplary embodiment includes descriptions of each of '1. Stabilization of the Vehicle Body', '2. Reducing Effects on the Drive System from Friction and External Disturbances', and '3. Control Procedure for the Omnidirectional Moving Device 1', and is the same as the description of the control method for the vehicle body 3 of the omnidirectional moving device 1 according to the first exemplary embodiment. However, the 'vehicle chassis 2' of the first exemplary embodiment has been replaced by 'vehicle chassis 6' in the present exemplary embodiment.

Operational Advantages of the Present Exemplary Embodiment

In the omnidirectional moving device 1 and attitude control method for the same according to the present exemplary embodiment, in the same way as the operational advantages obtained from the omnidirectional moving device 1 and attitude control method for the same according to the first exemplary embodiment, the operational advantages are obtained that it is possible to dynamically stabilize the vehicle body 3 which is statically unstable, and to additionally improve propulsive force, and to also improve quietness.

Figure 13A:
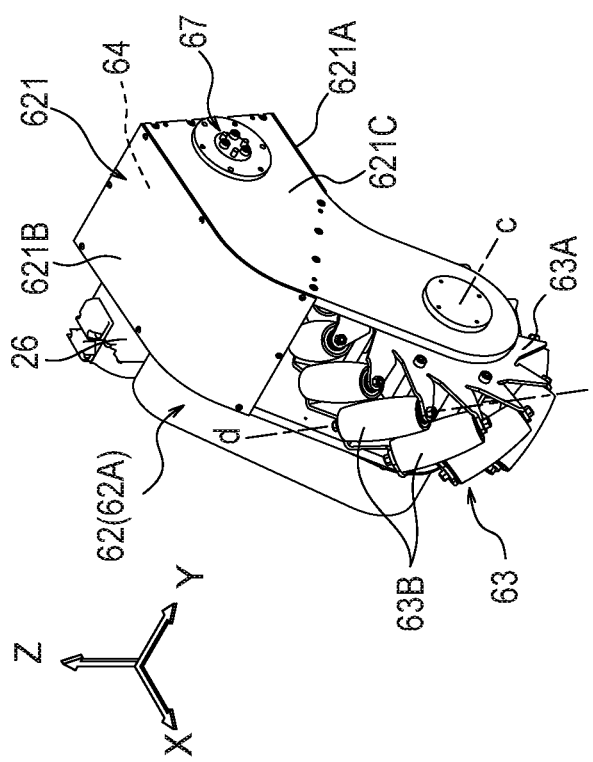
FIG. 13A is an external perspective view as seen from an upward direction on a left-front side showing one of the wheels of the vehicle chassis shown in FIG. 12, and a drive unit having this wheel.
Figure 13B:
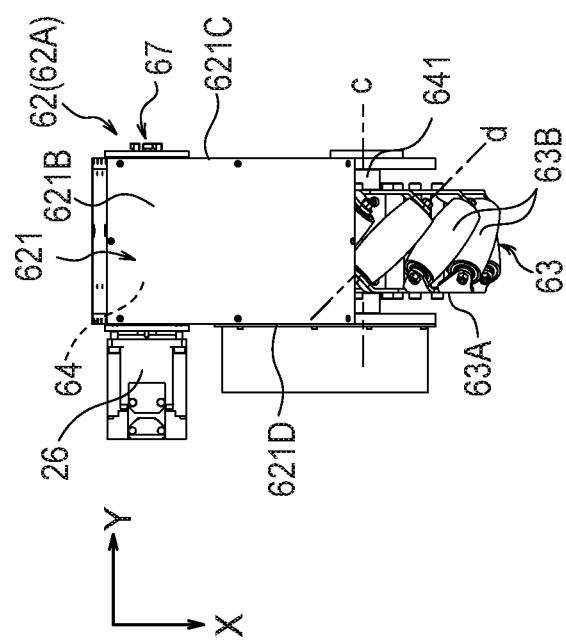
FIG. 13B is a top view as seen from above showing the wheel and drive unit.
Figure 13D:
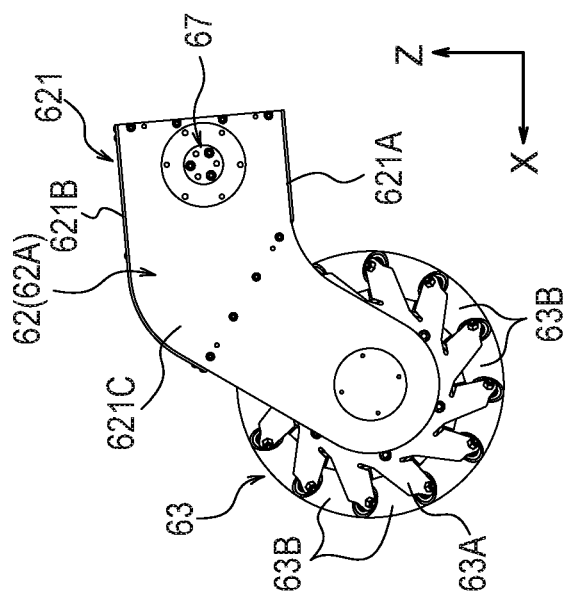
FIG. 13D is a side view as seen from a side showing the wheel and drive unit.
Figure 14A:
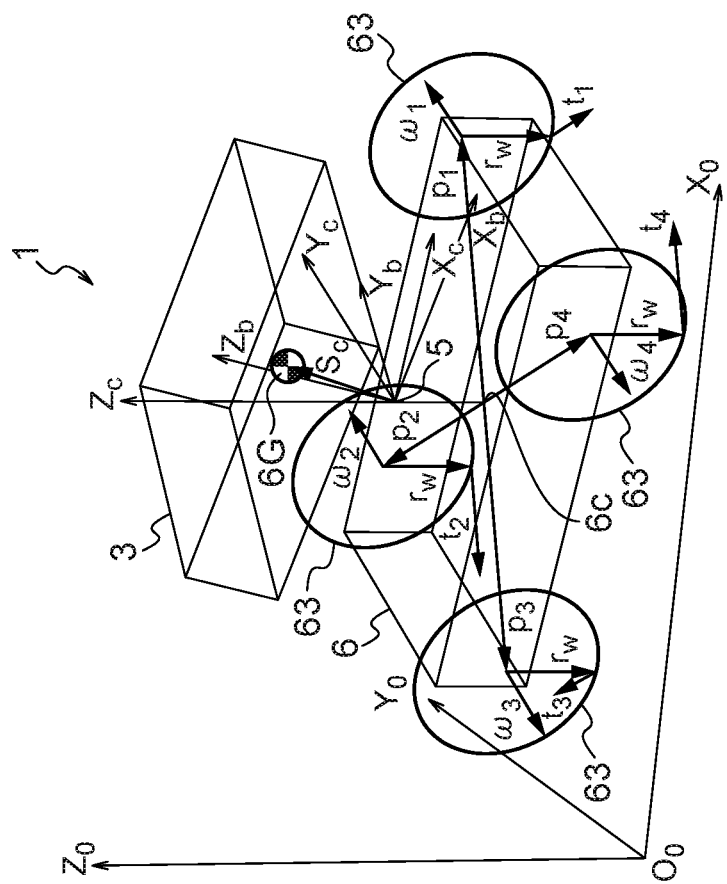
FIG. 14A is a schematic perspective view showing a model of the omnidirectional moving device according to the second exemplary embodiment in a three-dimensional coordinate system.
Figure 14B:
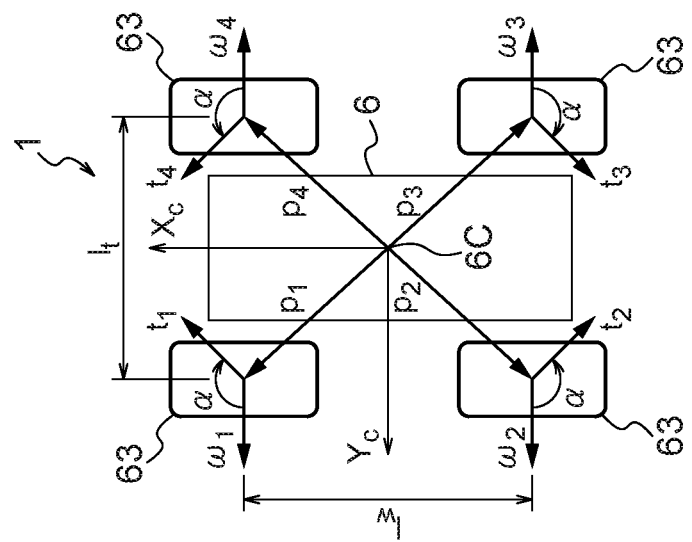
FIG. 14B is a schematic top view showing a model of the vehicle chassis and wheels of the omnidirectional moving device according to the second exemplary embodiment.

Moreover, in the omnidirectional moving device 1 according to the present exemplary embodiment, as is shown in FIG. 13A through FIG. 13D, in particular, the wheels 63 are formed by Mecanum wheels. As is shown in FIG. 13A through FIG. 13C, Mecanum wheels are formed by providing the plurality of barrel-shaped rollers 63B on the circumference of the driving wheel 63A, such that these rollers 63B rotate freely with a rotation axis d thereof extending in a tilted direction relative to the rotation axis c of the driving wheel 63A.

As a consequence, because it is possible, using the wheels 63, to cause the vehicle chassis 6 to move in a movement direction made possible by the rotation of the rollers 63B, in addition to movement directions made possible by the driving wheel 63A and by the rotation of the driving wheel 63A, it is possible to obtain an omnidirectional moving device 1 that is capable of moving in all directions on a plane.

Additional Exemplary Embodiments

The invention is not limited to the above-described embodiments and various modifications and the like may be made thereto insofar as they do not depart from the spirit or scope in the invention.

For example, in the invention, because the above-described Formula (6) that provides the velocity of the ground contact point of the Omni wheels on the travel path is the same as the formula that provides the velocity of the ground contact point of the Mecanum wheels on the travel path, it is possible to construct an omnidirectional moving device in which both Omni wheels and Mecanum wheels are used together. In other words, the invention makes it possible to construct an omnidirectional moving device that combines the omnidirectional moving device according to the first exemplary embodiment with the omnidirectional moving device according to the second exemplary embodiment.

Moreover, in the invention, it is also possible to mount a seat such as a saddle or the like on the vehicle body in the omnidirectional moving device according to the first exemplary embodiment such that a passenger is able to travel while in a seated state. Conversely, in the invention, it is also possible to remove the saddle from the vehicle body in the omnidirectional moving device according to the second exemplary embodiment such that a passenger travels while in a standing state.

INDUSTRIAL APPLICABILITY

Priority is claimed on Japanese Patent Application No. 2017-104669, filed May 26, 2017, the disclosure of which is incorporated herein by reference.

The invention claimed is:

1. An omnidirectional moving device, comprising:
   a vehicle chassis provided with a plurality of wheels that are movable omnidirectionally;
   a vehicle body that is disposed on the vehicle chassis;
   a universal coupling that joins the vehicle chassis to the vehicle body, that enables an attitude of the vehicle body to be changed relative to the vehicle chassis, and that, when the vehicle chassis is being driven, supports the attitude of the vehicle body relative to the vehicle chassis such that the attitude is statically unstable; and
   an attitude stabilizing system that sequentially acquires changes in the attitude of the vehicle body when the vehicle chassis is being driven, and by causing the vehicle chassis to move sequentially based on feedback control intended to cancel out the changes in the attitude of the vehicle body, maintains the attitude of the vehicle body relative to the vehicle chassis such that the attitude is dynamically stable.

2. The omnidirectional moving device according to claim 1, wherein the universal coupling has two kinematic pairs.

3. The omnidirectional moving device according to claim 2, wherein the universal coupling comprises:
   first rotation shafts that are supported at an upper portion of the vehicle chassis, and that have one movement direction of the vehicle chassis as a first axial direction;
   second rotation shafts that are supported at a lower portion of the vehicle body, and that have a second axial direction, which is another movement direction of the vehicle chassis and which intersects the first axial direction; and
   a spider that is rotatable around the first rotation shafts, and is also rotatable around the second rotation shafts.

4. The omnidirectional moving device according to claim 1, wherein the attitude stabilizing system is provided with a drive unit having:
   a motor that is provided in the vehicle chassis;
   a reduction gear that is provided in the vehicle chassis, and that increases driving torque of the motor and transmits the driving torque to the wheels; and
   a servo amp that is provided in the vehicle body, and is connected to the motor so as to drive the motor.

5. The omnidirectional moving device according to claim 1, wherein the wheels are at least one of Omni wheels or Mecanum wheels.

6. The omnidirectional moving device according to claim 4, wherein the attitude stabilizing system is provided with a control unit having:
   an angle detection portion that acquires a rotation angle of the motor;
   an attitude angle detection portion that acquires an attitude angle of the vehicle body and an angular velocity of the vehicle body; and a computation unit that, based on the rotation angle acquired by the angle detection portion and the attitude angle and the angular velocity acquired by the attitude angle detection portion, calculates an operating state for the vehicle body that maintains the attitude stability of the vehicle body, and controls the servo amp based on a result of the calculation.

7. The omnidirectional moving device according to claim 1, further comprising a damping device that is disposed between the wheels and the vehicle chassis, and that reduces vibration transmitted from the wheels to the vehicle chassis.

8. The omnidirectional moving device according to claim 3, wherein a locking device, that enables the attitude of the vehicle body to be changed when the vehicle chassis is moving, and locks the attitude of the vehicle body when the vehicle chassis has stopped, is fitted onto the first rotation shafts and the second rotation shafts.

9. An attitude control method for an omnidirectional moving device including the attitude stabilizing system of the omnidirectional moving device according to claim 6, the attitude control method causing the attitude stabilizing system to execute a process including:
    acquiring a rotation angle of the motor;
    acquiring an attitude angle of the vehicle body and an angular velocity of the vehicle body;
    calculating, based on the rotation angle, the attitude angle, and the angular velocity, an operating state of the vehicle body that maintains the attitude stability of the vehicle body; and
    controlling the servo amp based on a calculation result so as to move the vehicle chassis in a state in which the attitude stability is maintained.

10. The omnidirectional moving device according to claim 6, wherein the computation unit:
    calculates the angular velocity of the motor based on the rotation angle of the motor;
    calculates a generalized velocity of the vehicle chassis corresponding to the generalized coordinates of the vehicle chassis, which are shown by a position of the universal coupling and by the attitude angle of the vehicle body, based on the angular velocity of the motor and on a generalized inverse of a velocity transfer matrix that has been set in advance from a positional relationship between the vehicle chassis and the plurality of wheels;
    sets state quantities that show the attitude angle of the vehicle body and show changes in the attitude angle of the vehicle body based on the attitude angle of the vehicle body and the angular velocity of the vehicle body and on the generalized velocity of the vehicle chassis;
    calculates a general desired acceleration for the vehicle chassis so that an evaluation criterion, which is shown by a time integration of a function which includes the state quantities and the generalized desired acceleration of the vehicle chassis, is minimized, in order that the attitude stability of the vehicle body relative to the vehicle chassis is dynamically maintained; and
    controls the servo amp so that the generalized desired acceleration of the vehicle chassis can be achieved.

\* \* \* \* \*